US012615437B2

(12) United States Patent
Kinoshita et al.

(10) Patent No.: US 12,615,437 B2
(45) Date of Patent: Apr. 28, 2026

(54) CONTROL DEVICE CAPABLE OF REMOTELY CONTROLLING EXTERNAL DEVICE BY PERFORMING COMMUNICATION, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Yuichi Kinoshita, Kanagawa (JP); Youjirou Hiratsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 18/614,394

(22) Filed: Mar. 22, 2024

(65) Prior Publication Data

US 2024/0323523 A1 Sep. 26, 2024

(30) Foreign Application Priority Data

Mar. 23, 2023 (JP) ................................. 2023-046627
Dec. 20, 2023 (JP) ................................. 2023-215255

(51) Int. Cl.
*H04N 23/67* (2023.01)
*H04N 23/66* (2023.01)
*H04N 23/90* (2023.01)
(52) U.S. Cl.
CPC ............. *H04N 23/67* (2023.01); *H04N 23/66* (2023.01); *H04N 23/90* (2023.01)

(58) Field of Classification Search
CPC ........ H04N 23/67; H04N 23/66; H04N 23/90; H04N 23/62; H04N 23/631; H04N 23/632; H04N 23/661; H04N 23/695
See application file for complete search history.

(56) References Cited

U.S. PATENT DOCUMENTS 9,584,713 B2 * 2/2017 Ikeda ................... H04N 23/635
2015/0138390 A1 * 5/2015 Tomosada .............. H04N 23/71
348/222.1

(Continued)

FOREIGN PATENT DOCUMENTS

JP 2023009896 A 1/2023

*Primary Examiner* — Padma Haliyur
(74) *Attorney, Agent, or Firm* — Canon U.S.A., Inc. IP Division

(57) ABSTRACT
A control device, configured to be connected to and control a plurality of image capturing apparatuses, includes: a transmission device, one or more memories, and one or more processors. The one or more memories and the one or more processors are configured to select, for each of the plurality of image capturing apparatuses, a focus function to be used for the image capturing apparatus between an autofocus function and a manual focus function, control the transmission device to transmit a first image capturing instruction to all of the plurality of image capturing apparatuses in response to a first operation from a user, instruct, along with transmission of the first image capturing instruction, all image capturing apparatuses that receive the first image capturing instruction to use either the autofocus function or the manual focus function, and set, in advance, priority between the selected focus function and the instructed focus function.

19 Claims, 26 Drawing Sheets

(56)         References Cited

U.S. PATENT DOCUMENTS

| | | | | |
|---|---|---|---|---|
| 2015/0172531 A1* | 6/2015 | Ikeda | ..................... | H04N 23/70 |
| | | | | 348/207.11 |
| 2016/0014322 A1* | 1/2016 | Kimura | ............... | H04N 23/667 |
| | | | | 348/211.4 |
| 2016/0165142 A1* | 6/2016 | Hada | ..................... | H04N 23/62 |
| | | | | 348/211.1 |
| 2017/0332005 A1* | 11/2017 | Hongu | ................ | H04N 23/667 |
| 2019/0149718 A1* | 5/2019 | Torikai | ................ | H04N 23/667 |
| | | | | 348/211.3 |
| 2020/0073205 A1* | 3/2020 | Matsushima | .......... | H04N 23/62 |
| 2020/0228707 A1* | 7/2020 | Ueno | ................ | H04N 21/4223 |
| 2021/0152731 A1* | 5/2021 | Wakamatsu | ........... | H04N 23/61 |
| 2022/0321752 A1* | 10/2022 | Ohishi | ..................... | G02B 7/28 |
| 2022/0417443 A1* | 12/2022 | Mitsuda | ............... | H04N 23/667 |

* cited by examiner

100

101

CONTROLLER

111

112

113

IMAGE CAPTURING UNIT — 102

NON-VOLATILE MEMORY — 103

WORKING MEMORY — 104

OPERATION UNIT — 105

DISPLAY UNIT — 106

RTC — 107

RECORDING MEDIUM — 110

Figure 5O:
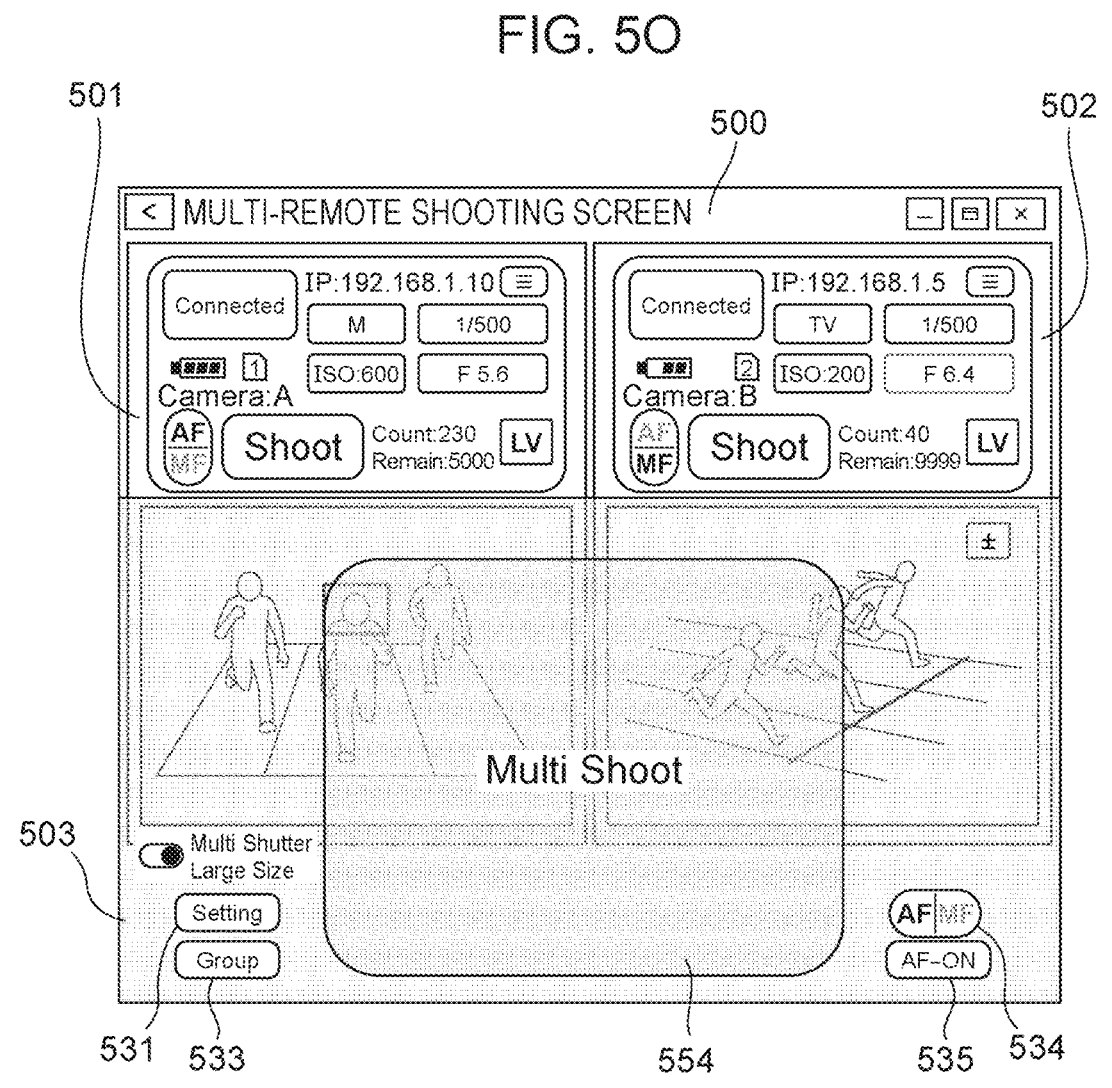

MULTI-REMOTE SHOOTING SCREEN

Connected IP:192.168.1.10
M 1/500
ISO:600 F 5.6
Camera:A
AF/MF Shoot Count:230 Remain:5000 LV Connected IP:192.168.1.5
TV 1/500
ISO:200 F 6.4
Camera:B
AF/MF Shoot Count:40 Remain:9999 LV Multi Shoot 503 Multi Shutter Large Size Setting
Group

Figure 5P:
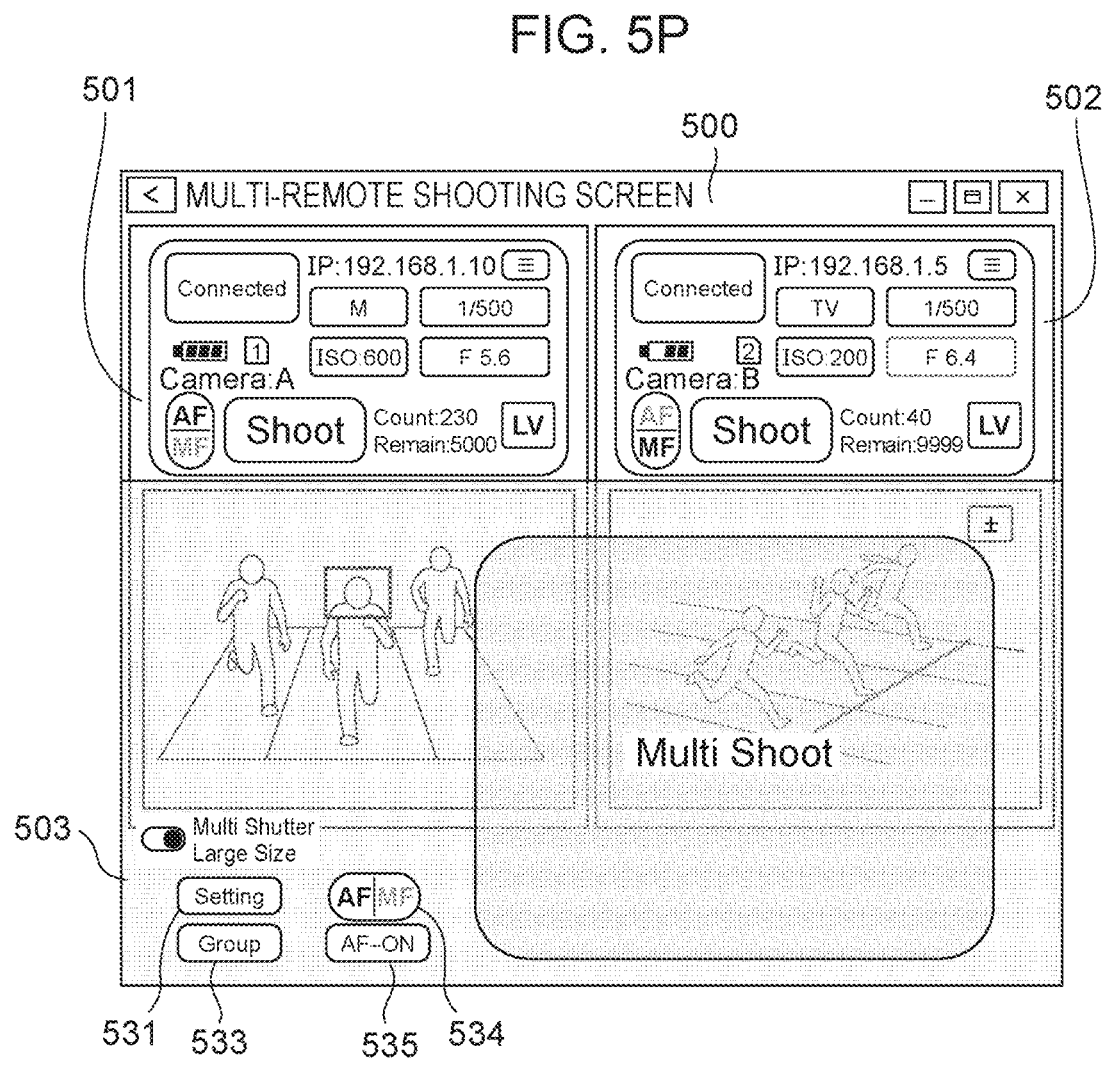

MULTI-REMOTE SHOOTING SCREEN          [−] [□] [×]

Camera:A
Connected     IP:192.168.1.10  ≡
              M        1/500
[1]           ISO:600   F 5.6
AF/MF    Shoot    Count:230    LV
                  Remain:5000

Camera:B
Connected     IP:192.168.1.5  ≡
              TV       1/500
[2]           ISO:200   F 6.4
AF/MF    Shoot    Count:40     LV
                  Remain:9999

±

Multi Shoot

Multi Shutter
Large Size

503

Setting    AF|MF
Group      AF-ON 531    533          535    534

FIG. 5Q

CONTROL DEVICE CAPABLE OF REMOTELY CONTROLLING EXTERNAL DEVICE BY PERFORMING COMMUNICATION, CONTROL METHOD, AND NON-TRANSITORY COMPUTER-READABLE STORAGE MEDIUM

BACKGROUND

Field of the Disclosure

The present disclosure relates to a control device capable of remotely controlling other devices.

Description of the Related Art

Recently, systems in which a computer connected to a plurality of cameras through a network controls each camera have been known (Japanese Patent Laid-Open No. 2023-9896).

In sports photography as in Japanese Patent Laid-Open No. 2023-9896, it is desirable to capture images in various compositions at the same time. When a plurality of cameras are caused to capture images simultaneously in a synchronized manner with a single shooting command using a remote shooting system for such various compositions, it is necessary to use autofocus and manual focus according to the individual compositions and subject movements.

However, the systems using existing techniques are not capable of remotely switching between autofocus and manual focus as desired for each camera according to the compositions and subjects. Thus, there are problems such as taking out-of-focus photos and having to change the focus settings of individual installed cameras during the competition. As described above, the remote control environment using the existing system is not an environment that facilitates remote control in line with the user's intention.

SUMMARY

The present disclosure provides a control device configured to be connected to and control a plurality of image capturing apparatuses, the control device including: a transmission device, one or more memories storing instructions, and one or more processors. The one or more memories and the one or more processors are configured to select, for each of the plurality of image capturing apparatuses, a focus function to be used for the image capturing apparatus between an autofocus function and a manual focus function, control the transmission device to transmit a first image capturing instruction to all of the plurality of image capturing apparatuses in response to a first operation from a user, instruct, along with transmission of the first image capturing instruction, all image capturing apparatuses, of the plurality of image capturing apparatuses, that receive the first image capturing instruction to use either the autofocus function or the manual focus function, and set, in advance, priority between the selected focus function and the instructed focus function.

Further features of various embodiments of the present disclosure will become apparent from the following description of exemplary embodiments with reference to the attached drawings.

BRIEF DESCRIPTION OF THE DRAWINGS

FIG. 5O illustrates an example of the screen of the control device according to the first embodiment.

FIG. 5P illustrates an example of the screen of the control device according to the first embodiment.

FIG. 5Q illustrates an example of the screen of the control device according to the first embodiment.

DESCRIPTION OF THE EMBODIMENTS

In the following, embodiments of the present disclosure will be described in detail with reference to the attached drawings.

Note that the embodiments described below are examples of a means to realize the present disclosure, and may be modified or changed as necessary depending on the configuration of an apparatus to which the present disclosure is applied and various conditions. Moreover, the embodiments can also be combined as appropriate.

First Embodiment

Configuration of Digital Camera

Figures 1A, 1B, 1C:
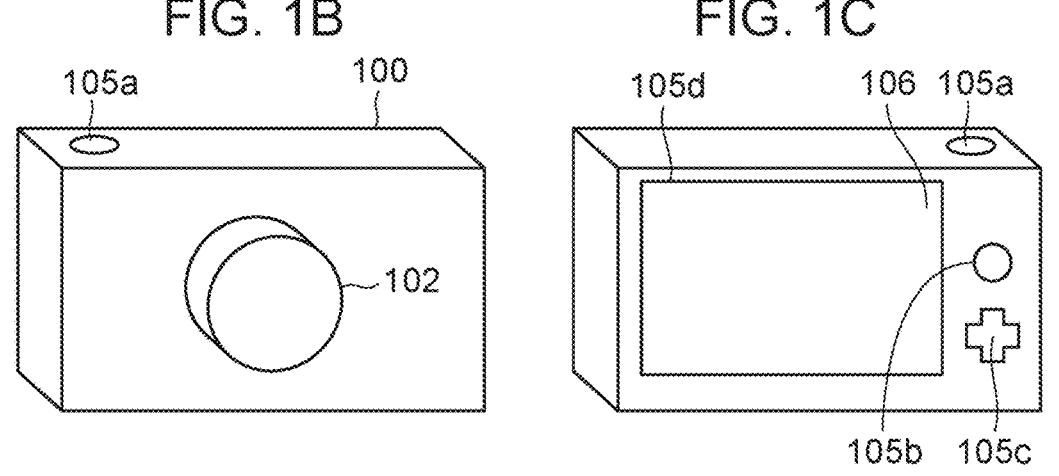
FIGS. 1A to 1C are hardware configuration diagrams illustrating the configuration of a communication device according to a first embodiment.

FIG. 1A is a hardware configuration diagram illustrating an example of the configuration of a digital camera 100, which is an example of a communication device according to the present embodiment. Note that, in this case, a digital camera will be described as an example of a communication device; however, the communication device is not limited to this. For example, the communication device may be an information processing device, such as a portable media player, a so-called tablet device, or a personal computer.

A controller 101 is a central processing unit (CPU) that controls individual units of the digital camera 100 in accordance with an input signal or a program to be described below. Note that, instead of the controller 101 controlling the entire device, hardware such as a plurality of CPUs and graphics processing units (GPUs) may share processing to control the entire device.

An image capturing unit 102 includes, for example, an optical system and an image capturing element. The optical system controls an optical lens unit, aperture, zoom, focus, and so forth. The image capturing element converts light (an image) introduced through the optical lens unit into an electrical image signal. As the image capturing element, a complementary metal-oxide-semiconductor (CMOS) or a charge-coupled device (CCD) is generally used. By being controlled by the controller 101, the image capturing unit 102 converts subject light focused by the lens included in the image capturing unit 102 into an electrical signal using the image capturing element, and performs noise reduction processing and so forth to output digital data as image data. In the digital camera 100 according to the present embodiment, image data is recorded on a recording medium 110 in accordance with the Design Rule for Camera File System (DCF) standard.

A non-volatile memory 103 is an electrically erasable recordable non-volatile memory, and stores, for example, a to-be described program executed by the controller 101.

A working memory 104 is used as a buffer memory that temporarily stores image data captured by the image capturing unit 102, an image display memory of a display unit 106, a working area of the controller 101, and the like.

An operation unit 105 is used to receive, from the user, an instruction issued by the user to the digital camera 100. The operation unit 105 includes, for example, a power button for the user to turn the digital camera 100 on and off, a release switch for instructing image capturing, and a playback button for instructing playback of image data. Furthermore, the operation unit 105 includes operation members, such as a dedicated connection button for starting communication with an external device through a communication unit 111 to be described below. Moreover, the operation unit 105 includes a touch panel formed in the display unit 106 to be described below. Note that the release switch includes SW1 and SW2. SW1 is turned ON when the release switch is in the so-called half-pressed state. This makes it possible to receive a command to prepare for image capturing, such as autofocus (AF) processing, auto exposure (AE) processing, auto white balance (AWB) processing, and Electro-Focus (EF) processing (pre-flash illumination). SW2 is turned ON when the release switch is in the so-called fully pressed state. This makes it possible to receive a command to perform shooting. Furthermore, the operation unit 105 includes an image capturing mode dial. The image capturing mode dial is an operation member for operating the image capturing apparatus in any one of a plurality of modes including a mode using the autofocus function and a mode using a manual focus function. In a case where the image capturing mode is the mode using autofocus, the AF processing is performed when the above-described release switch is half-pressed.

In the mode using manual focus, the AF processing is not performed even when the release switch is in the half-pressed state. Note that the image capturing mode selection method is not limited to the one performed by operating a dial. For example, a list of image capturing modes is displayed by operating a menu that is not illustrated, and an image capturing mode may be determined by the user selecting from the list. Information on the image capturing mode selected in this manner is held in the non-volatile memory 103.

The display unit 106 displays a viewfinder image during shooting, displays captured images, and displays text for communicational operations. Note that the display unit 106 does not have to be included in the digital camera 100. It is sufficient that the digital camera 100 can be connected to the display unit 106 located inside or outside the digital camera 100 and have at least a display control function for controlling display of the display unit 106.

An RTC 107 performs clock management. Time may be set by the user using the operation unit 105, or time may be set by acquiring time information via the communication unit 111 or by capturing time information through a radio-controlled clock. It is sufficient that time can be managed.

The recording medium 110 can record image data output from the image capturing unit 102.

The recording medium 110 may be configured to be detachable to the digital camera 100 or built in the digital camera 100. That is, it is sufficient that the digital camera 100 have at least a means to access the recording medium 110. Moreover, the digital camera 100 may be configured to be capable of loading a plurality of recording media simultaneously.

The communication unit 111 is an interface for connecting to external devices. The digital camera 100 according to the present embodiment can exchange data with external devices via the communication unit 111. For example, image data generated by the image capturing unit 102 can be transmitted to an external device through the communication unit 111. Note that, in the present embodiment, the communication unit 111 includes an interface for communicating with external devices through a so-called wireless LAN according to the IEEE 802.11 standard. The controller 101 realizes wireless communication with external devices by controlling the communication unit 111. Note that the communication method is not limited to a wireless LAN and includes, for example, an infrared communication method.

A communication unit 112 is an interface for connecting to external devices. The digital camera 100 according to the present embodiment can exchange data with external devices via the communication unit 112. For example, image data generated by the image capturing unit 102 can be transmitted to an external device via the communication unit 112. Note that, in the present embodiment, the communication unit 112 includes an interface for communicating with external devices through so-called Bluetooth® according to the IEEE 802.15.1 standard. The controller 101 realizes wireless communication with external devices by controlling the communication unit 112.

A communication unit 113 is an interface for connecting to external devices. The digital camera 100 according to the present embodiment can exchange data with external devices via the communication unit 113. For example, image data generated by the image capturing unit 102 can be transmitted to an external device via the communication unit 113. Note that, in the present embodiment, the communication unit 113 includes an interface for communicating with external devices through a so-called wired LAN (Ethernet) according to the IEEE 802.3 standard. The controller 101 realizes communication with external devices by controlling the communication unit 113. Note that the communication method is not limited to a wired LAN and includes, for example, a USB communication method.

Note that the communication unit 112 of the digital camera 100 according to the present embodiment has either a peripheral mode or a central mode. By operating the communication unit 112 in the peripheral mode, the digital camera 100 according to the present embodiment can operate as a Bluetooth® client device. In a case where the digital camera 100 operates as a client device, the digital camera 100 can communicate by connecting to an external device that is in the central mode. Note that for authentication with the external device to be connected, the unique information of the external device to be connected is kept in the non-volatile memory 103 through pairing performed in advance. Moreover, if power is supplied to the Bluetooth® module, the digital camera 100 can initiate communication even in a case where the power switch of the digital camera 100 is turned off.

A close-proximity wireless communication unit 114 includes, for example, an antenna for wireless communication, and a modulation/demodulation circuit and a communication controller for processing wireless signals. The close-proximity wireless communication unit 114 realizes contactless close proximity communication according to the ISO/IEC 18092 standard (near-field communication (NFC)) by outputting modulated wireless signals from the antenna and demodulating wireless signals received by the antenna. The close-proximity wireless communication unit 114 according to the present embodiment is arranged on the side portion of the digital camera 100.

The digital camera 100 may initiate communication with a control device 200, which will be described below, to establish a connection. This is achieved by bringing the proximity wireless communication unit 114 of the digital camera 100 and the proximity wireless communication unit 214 of the control device 200 in close proximity to each other. Note that when using the proximity wireless communication unit 114 to connect to the control unit 200, it is not necessary to bring the proximity wireless communication unit 114 and the proximity wireless communication unit 214 into contact. The close-proximity wireless communication unit 114 and the close-proximity wireless communication unit 214 can communicate with each other even when the close-proximity wireless communication units 114 and 214 are spaced apart by a certain distance. Thus, in order to connect the digital camera 100 and the control device 200 to each other, it is sufficient for the close-proximity wireless communication units 114 and 214 to be brought into the range where close-proximity wireless communication is possible. In the following description, bringing devices into the range where close-proximity wireless communication is possible is also referred to as bringing them into close proximity.

Next, the exterior of the digital camera 100 will be described. FIGS. 1B and 1C are diagrams illustrating an example of the exterior of the digital camera 100. A release switch 105*a*, a playback button 105*b*, a directional key 105*c*, and a touch panel 105*d* are operational members included in the operation unit 105 described above. The display unit 106 displays images obtained as a result of image capturing performed by the image capturing unit 102.

The lens unit of the image capturing unit 102 is detachable. The image capturing unit 102 can capture images of various scenes by switching between lens units with various performances. When performing AF processing, the controller 101 controls the lens unit of the image capturing unit 102 to perform processing to focus. In contrast, when using manual focus, the user adjusts the focus of the lens unit by performing operations, such as turning a ring on the lens unit (manual focusing).

The preceding text provides the description of the digital camera 100.

Internal Configuration of Control Device 200

Figure 2:
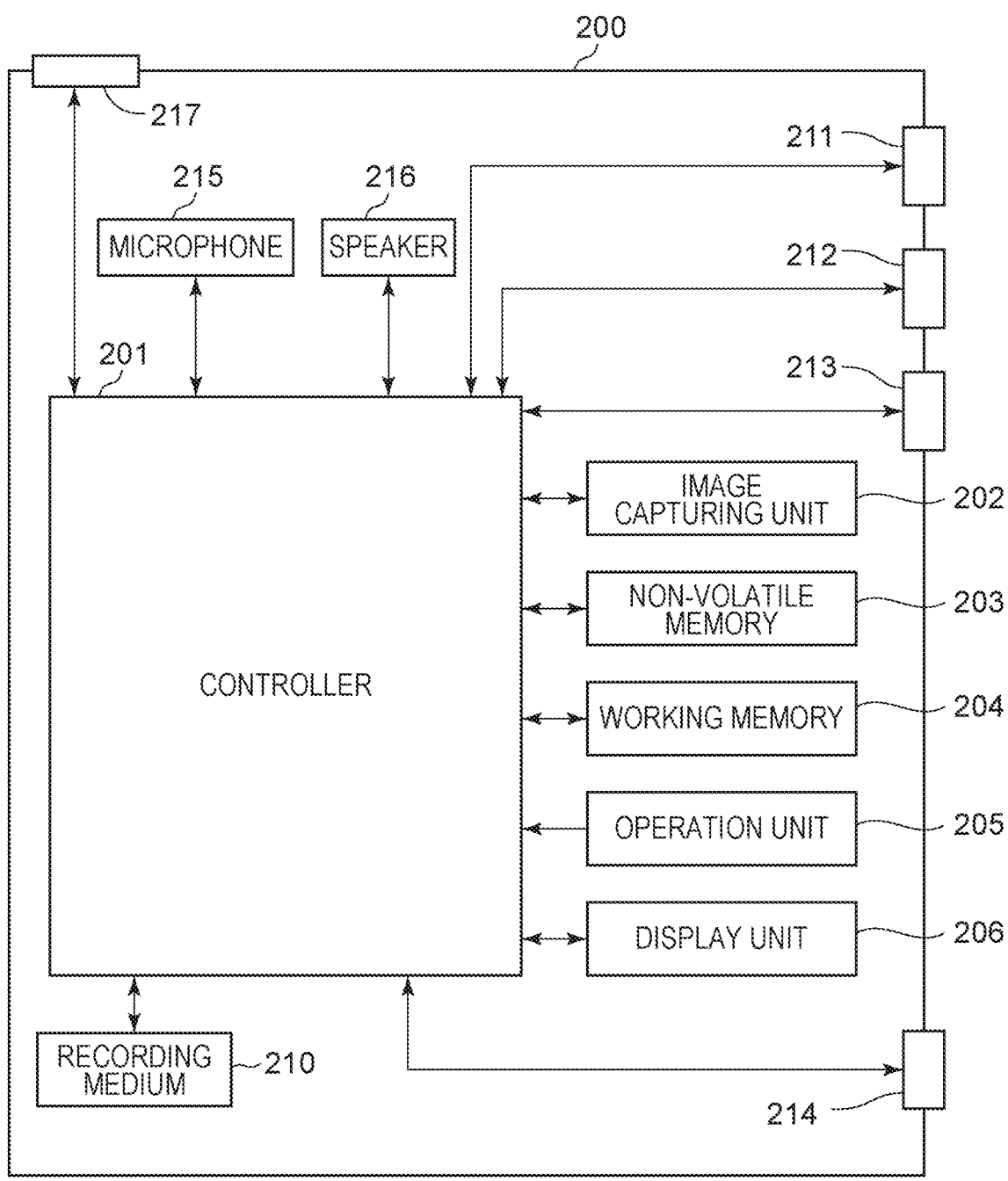
FIG. 2 is a hardware configuration diagram illustrating the configuration of a control device according to the first embodiment.

FIG. 2 is a hardware configuration diagram illustrating an example of the configuration of the control device 200, which is an example of an information processing device according to the present embodiment. The control device 200 is a smartphone. Note that, in this case, a smartphone will be described as an example of the information processing device; however, the information processing device is not limited to a smartphone.

For example, the information processing device may be, for example, a digital camera, smartphone, tablet device, or personal computer with a wireless function.

A controller 201 is a CPU that controls individual units of the control device 200 in accordance with an input signal or a program to be described below. Note that, instead of the controller 201 controlling the entire device, a plurality of CPUs and GPUs may share processing to control the entire device.

A non-volatile memory 203 is an electrically erasable recordable non-volatile memory. The non-volatile memory 203 contains an operating system (OS), which is the basic software executed by the controller 201, and applications that realize applied functions in cooperation with the OS. Moreover, in the present embodiment, the non-volatile memory 203 contains an application (hereinafter referred to as an app) for communicating with the digital camera 100. This application is downloaded and installed from a server on the Internet via a public network connection unit 217 to be described below.

A working memory 204 is used as an image display memory of a display unit 206, a working area of the controller 201, and the like.

An operation unit 205 is used to receive, from the user, an instruction to the control device 200. The operation unit 205 includes, for example, a power button for the user to instruct ON/OFF of the power supply of the control device 200, an operational member for setting an RTC, and an operational member such as a touch panel formed in the display unit 206.

The display unit 206 displays images represented by image data and text for interactive operations, for example. Note that the display unit 206 is not necessarily included in the control device 200. It is sufficient that the control device 200 can be connected to the display unit 206 and have at least a display control function for controlling display of the display unit 206.

The RTC performs clock management. Time may be set by the user using the operation unit 205, or time may be set by acquiring time information via a communication unit 211, a communication unit 212, or a communication unit 213 or by capturing time information through a radio-controlled clock. It is sufficient that time can be managed. Alternatively, time may also be acquired by a detection mechanism from a mechanical mechanism such as an analog clock. (In this case, suppose that the RTC includes the detection mechanism from an analog clock).

A recording medium 210 can record image data transferred to the controller 201 from the digital camera 100 via the communication unit 211. The recording medium 210 may be configured to be detachable to the control device 200 or built in the control device 200. That is, it is sufficient that the control device 200 have at least a means to access the recording medium 210.

The communication unit 211 is an interface for connecting to external devices. The control device 200 according to the present embodiment can exchange data with external devices via the communication unit 211. In the present embodiment, the communication unit 211 is an antenna, and the controller 201 can connect to the digital camera 100 via the antenna. Note that, in the present embodiment, the communication unit 211 includes an interface for communicating with external devices through a so-called wireless LAN according to the IEEE 802.11 standard. The controller 201 realizes wireless communication with external devices by controlling the communication unit 211. Note that the communication method is not limited to a wireless LAN and includes, for example, an infrared communication method.

The communication unit 212 is an interface for connecting to external devices. The control device 200 according to the present embodiment can exchange data with external devices via the communication unit 212. For example, the communication unit 212 can receive the image data generated by the digital camera 100 via the communication unit 212. Note that, in the present embodiment, the communication unit 212 includes an interface for communicating with external devices through so-called Bluetooth® according to the IEEE 802.15.1 standard. The controller 201 realizes wireless communication with external devices by controlling the communication unit 212. Note that the communication method is not limited to Bluetooth®, and examples of the communication method include a wireless LAN known as IEEE 802.11 and an infrared communication method.

The communication unit 213 is an interface for connecting to external devices. The control device 200 according to the present embodiment can exchange data with external devices via the communication unit 213. Note that, in the present embodiment, the communication unit 213 includes an interface for communicating with external devices through a so-called wired LAN (Ethernet) according to the IEEE 802.3 standard. The controller 201 realizes communication with external devices by controlling the communication unit 213. Note that the communication method is not limited to a wired LAN and includes, for example, a USB communication method.

Note that the communication unit 212 of the control device 200 according to the present embodiment has either a peripheral mode or a central mode. By operating the communication unit 212 in the central mode, the control device 200 according to the present embodiment can operate as a Bluetooth® server device. In a case where the control device 200 operates as a server device, the control device 200 can communicate by connecting to an external device that is in the peripheral mode. Note that for authentication with the external device to be connected, the unique information of the external device to be connected is kept in the non-volatile memory 203 through pairing performed in advance.

A close-proximity wireless communication unit 214 includes, for example, an antenna for wireless communication, and a modulation/demodulation circuit and a communication controller for processing wireless signals. The close-proximity wireless communication unit 214 realizes contactless close proximity communication according to the ISO/IEC 18092 standard (near-field communication (NFC)) by outputting modulated wireless signals from the antenna and demodulating wireless signals received by the antenna. The close-proximity wireless communication unit 214 according to the present embodiment is arranged on the rear side surface of the control device 200.

The control device 200 has a microphone 215 and a speaker 216. Furthermore, the control device 200 has the public network connection unit 217, which is an interface for connecting to a public network line.

Using these, the user can make calls with other telephone devices.

System Configuration Diagram

Next, the diagram of a system configuration according to the embodiment will be described.

Figure 3:
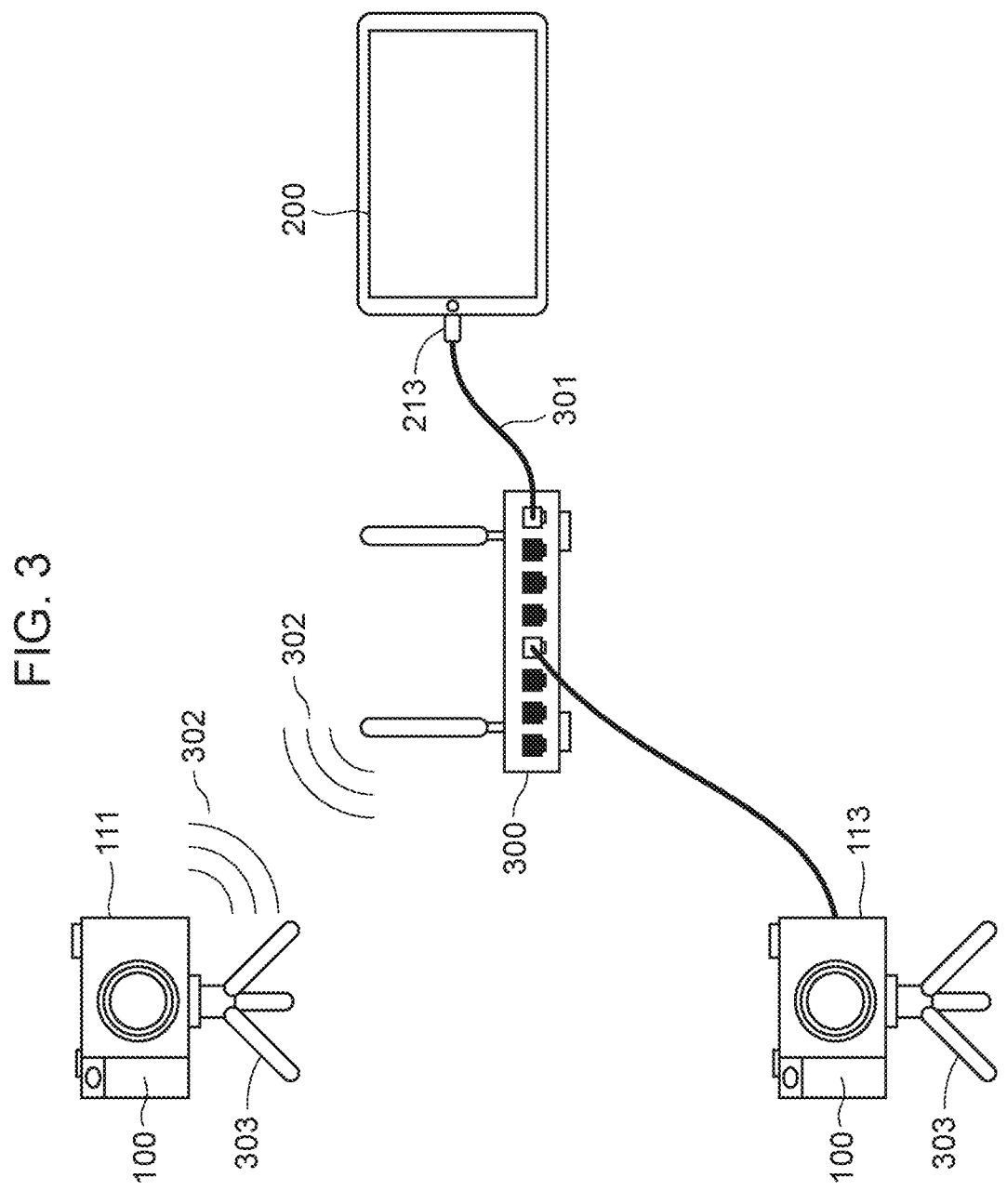
FIG. 3 is a diagram of a system configuration according to the first embodiment.

FIG. 3 is a diagram of a system configuration in which a plurality of digital cameras 100 and the control device 200 are connected through a network device 300, and the plurality of digital cameras 100 are remotely controlled by the control device 200.

The digital cameras 100 are mounted on tripods 303 or the like and installed at individual image capturing positions. Note that, in the present embodiment, the digital cameras 100 are mounted on the tripods 303 but may also be mounted on remote pan heads on which pan/tilt/zoom control can be remotely performed.

An example of a connection form, there is a case where some or all of the digital cameras 100 communicate with the control device 200 through wireless communication using radio waves 302 via the communication unit 112 and the network device 300, which is a relay. Furthermore, there is a case where some or all of the digital cameras 100 communicate with the control device 200 using a wired LAN via the communication unit 113 and the network device 300.

Moreover, there is a case where the control device 200 communicates with some or all of the digital cameras 100 through wireless communication using radio waves 302 via the communication unit 212 and the network device 300, which is a relay. Furthermore, there is a case where the control device 200 communicates with some or all of the digital cameras 100 using a wired LAN via the communication unit 213 and the network device 300.

Note that, in the present embodiment, an example has been illustrated in which communication is performed via the network device 300; however, each digital camera 100 and the control device 200 may be directly connected to each other.

As illustrated in FIG. 3, in a state where the plurality of installed digital cameras 100 and the control device 200 can communicate, the control device 200 can acquire, from each digital camera 100, setting information regarding the digital camera 100. Furthermore, the control device 200 can command each digital camera 100 to change the settings.

Furthermore, the control device 200 can issue a command to capture an image and issue a command regarding the presence or absence of focus drive accordingly, so that an image capturing instruction can be remotely issued. Note that the command regarding the presence or absence of focus drive in this case is independent of the above-described image capturing mode of the camera, and is not affected by the image capturing mode. For example, in a case where the digital camera 100 also receives a command not to drive focus when receiving an image capturing instruction remotely from the control device 200, the digital camera 100 does not perform AF processing even when the digital camera 100 is in the image capturing mode using autofocus. Moreover, for example, in a case where the digital camera 100 also receives a command to drive focus when receiving an image capturing instruction remotely from the control device 200, the digital camera 100 performs AF processing even when the digital camera 100 is in the image capturing mode using manual focus. Additionally, even if the digital camera 100 receives a command regarding the presence or absence of focus drive, the digital camera 100 will not change the setting to use either autofocus or manual focus.

Note that, depending on the performance of the lens attached to the digital camera 100, in a case where the camera is in a state where manual focus is used (hereinafter also referred to as manual focus mode), there may be a case where the camera cannot drive the lens even when instructed remotely to drive autofocus. In order to avoid such a case, the control device 200 may determine, upon connecting to the digital camera 100, whether the digital camera 100 is in manual focus mode, for example. In a case where the digital camera 100 is in manual focus mode, the display unit 206 may be caused to display a warning message. Furthermore, in this case, the control device 200 may acquire the performance of the lens of the digital camera 100 upon connecting to the digital camera 100. Even when the digital camera 100 is in manual focus mode, when the lens can be driven with autofocus, a warning message does not have to be displayed. By doing this, it is possible to reduce the risk of the inconvenience of having to move to the digital camera 100 to adjust settings when it is time to capture an image.

Composition of Subjects in Track and Field Events

Next, a scene where a plurality of digital cameras according to an embodiment that are installed in a sports stadium are used to capture images will be taken as an example.

In this section, track and field events will be used as an example to illustrate situations in which it is necessary to differentiate the use of autofocus and fixed focus (manual focus) during shooting.

First, in a case where autofocus is used, the process of focusing is performed after the user inputs an image capturing instruction, and thus a certain amount of time is needed to capture an image of the subject.

Instead, the focus adjustment is performed automatically, which reduces the possibility of focus misalignment caused by user operation and also eliminates the need for such an operation.

In contrast, manual focus can be used to determine, for example, the focus position in advance. If shooting can be performed with the subject placed at that position in the composition, it enables capturing images without performing the focus adjustment process at the timing of shooting. This capability allows for managing more critical shooting timings.

On the basis of these differences in characteristics, it is assumed that professional users differentiate their use of autofocus and manual focus in track and field events, as illustrated in the following example.

Figure 4A:
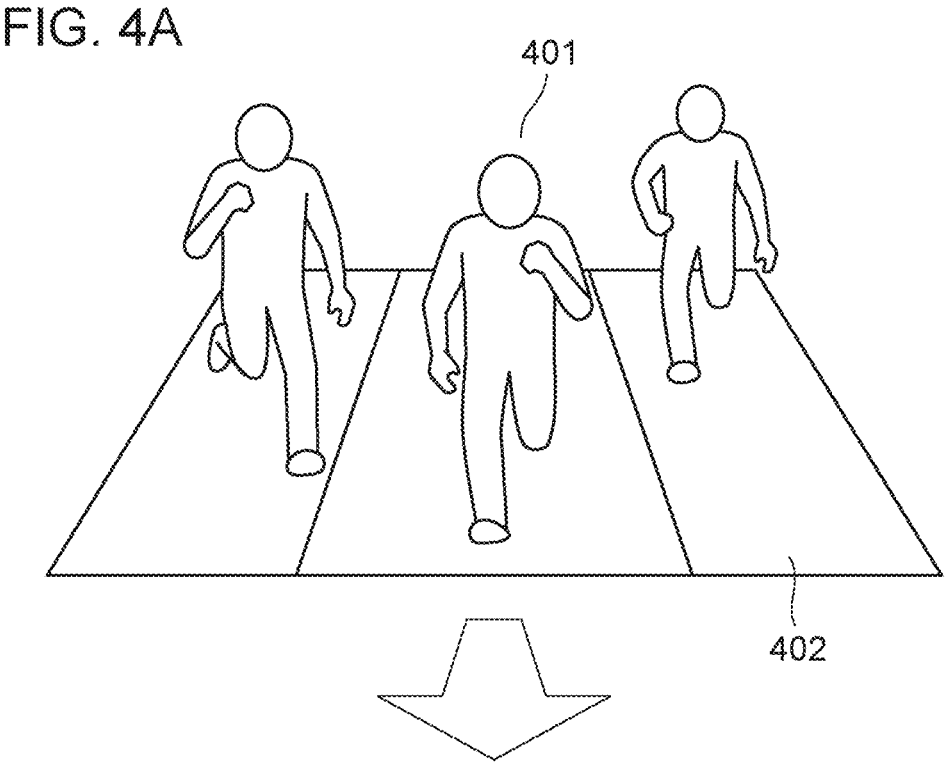
FIGS. 4A and 4B are diagrams illustrating an application scenario of this system according to the first embodiment.

First, as illustrated in FIG. 4A, in a composition where a subject 401, which is an image capturing target, is approaching the camera, the subject 401 stays in the image capturing range of the digital camera 100 for an extended period. Thus, it is possible to capture in-focus photos using autofocus during shooting. That is, autofocus is assumed to be used in this scene.

Figure 4B:
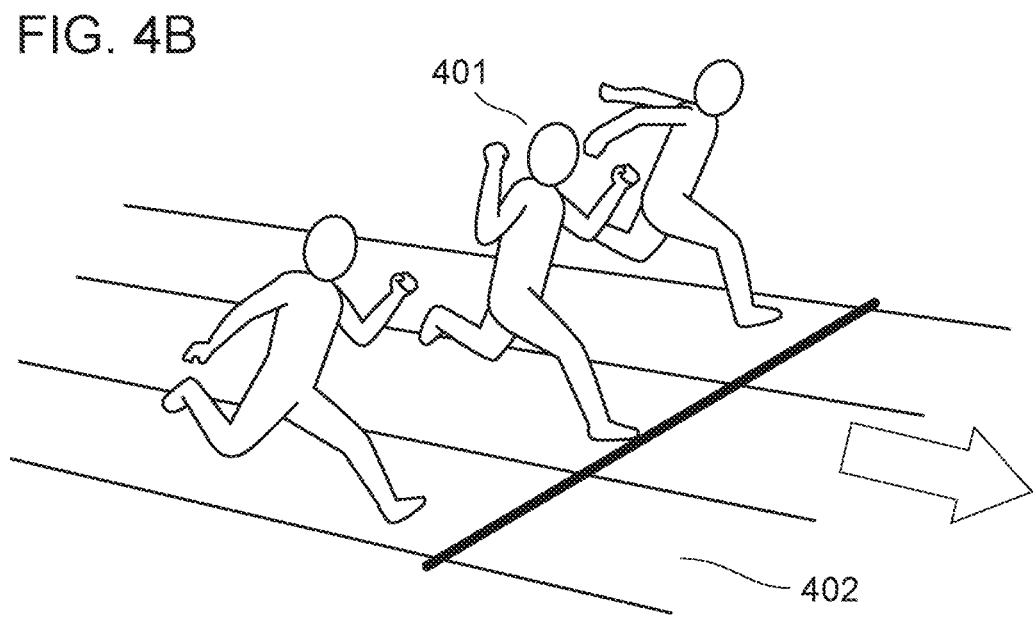

In contrast, as illustrated in FIG. 4B, in the composition in which the subject 401 running on a track 402 suddenly enters the image capturing range, which is the angle of view of the digital camera, the subject 401 quickly runs through the image capturing range corresponding to the composition. Thus, even when the photographer captures an image at the moment when the subject 401 enters the image capturing range, it is a challenging situation to instantly focus on the subject 401 using autofocus and capture an image. In this situation, it is highly likely to focus on the track 402 beyond the track 402 corresponding to the subject 401 and capture unsuccessful images (such as heavily blurred images) since it becomes difficult to focus on the subject 401 properly.

Thus, in the composition as illustrated in FIG. 4B, the digital camera 100 is caused to adjust focus using manual focus in advance by the control device 200, and an image capturing method using pre-set focus is used to fix focus during shooting. By doing so, when the photographer tries to match only the shooting start timing using the continuous shooting function, the photographer can often take the intended photo. That is, it is assumed to use manual focus in this scene.

In this manner, different focus functions need to be used for different scenes.

Control Screen for Multi-Remote Shooting

The following describes the screen for control operations used by the user of the control device when a plurality of digital cameras are remotely controlled from the control device using the system according to the present embodiment.

Figure 5A:
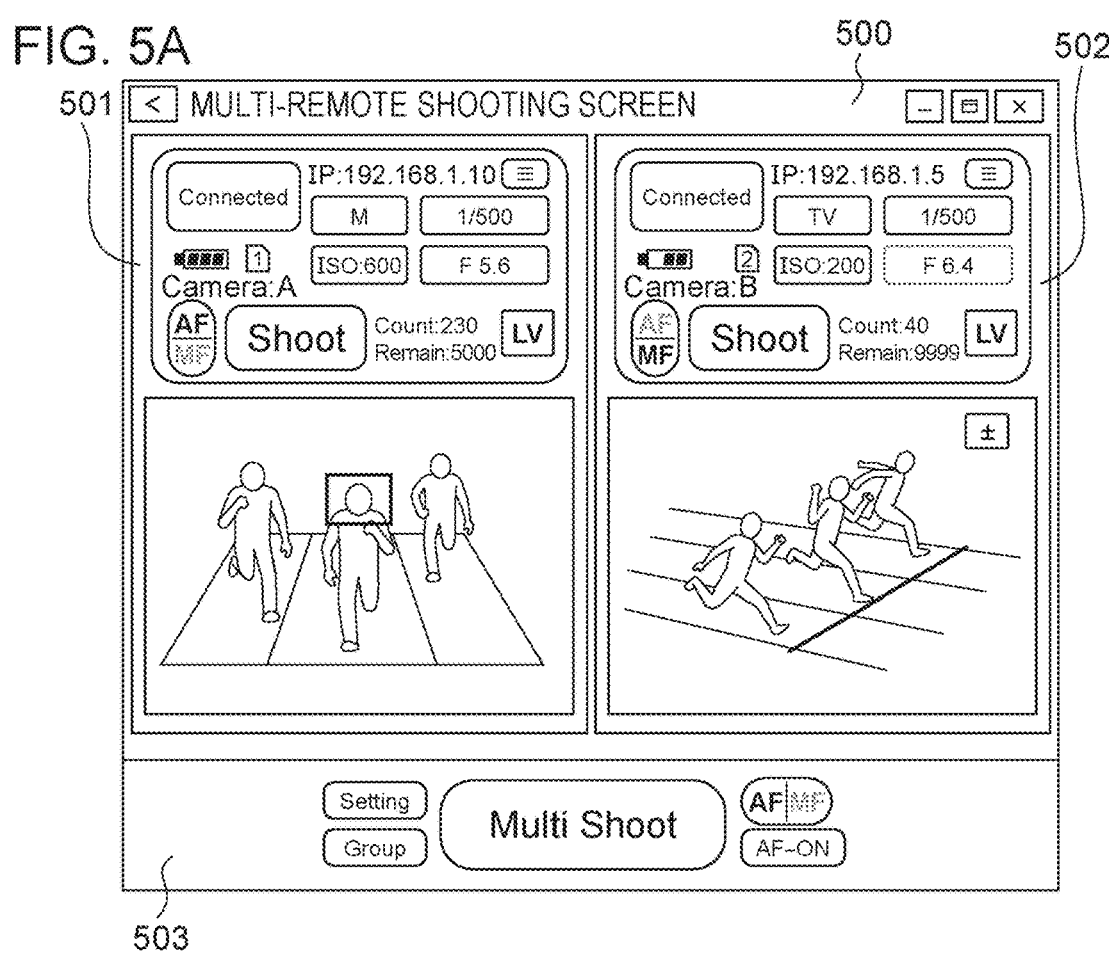
FIG. 5A illustrates an example of a screen of the control device according to the first embodiment.

FIG. 5A illustrates the configuration of a screen for connecting two digital cameras 100 and the control device 200 and controlling image capturing to be performed by the plurality of digital cameras 100 (hereinafter referred to as "multi-remote shooting") displayed on the display unit 206 of the control device 200. This screen is a screen displayed by controlling a remote application for controlling a plurality of digital cameras, the control of the remote application being performed in response to an operation performed by the user operating the operation unit 205 of the control device 200 (a click operation with the mouse or a touch operation through the touch panel).

Through this multi-remote shooting screen denoted by 500, the user can remotely set settings in each digital camera 100 or issue an image capturing instruction to the digital camera 100.

The multi-remote shooting screen 500 includes an individual camera control member group 501. The individual camera control member group 501 controls an individual digital camera 100 connected to the control device 200. Through the individual camera control member group 501, settings related to shooting, a focus command, and shooting are controlled, for example. Furthermore, the multi-remote shooting screen 500 includes an individual camera control member group 502 for controlling the second digital camera 100 connected to the control device 200. The multi-remote shooting screen 500 also includes a multi-camera control member 503 for controlling a plurality of digital cameras 100 at once (hereinafter control of a plurality of cameras will be referred to as "multi-camera control"). The individual camera control member group 501 and the individual camera control member group 502 for the second digital camera 100 have the same functions.

In this example, the case of two cameras to be controlled is illustrated; however, it is possible to control three or more cameras. When the connection settings for the third and subsequent digital cameras 100 are registered in the control device 200, the individual camera control member group for one of the third and subsequent digital cameras 100 as the third digital camera is added to the multi-remote shooting screen 500.

Figure 5B:
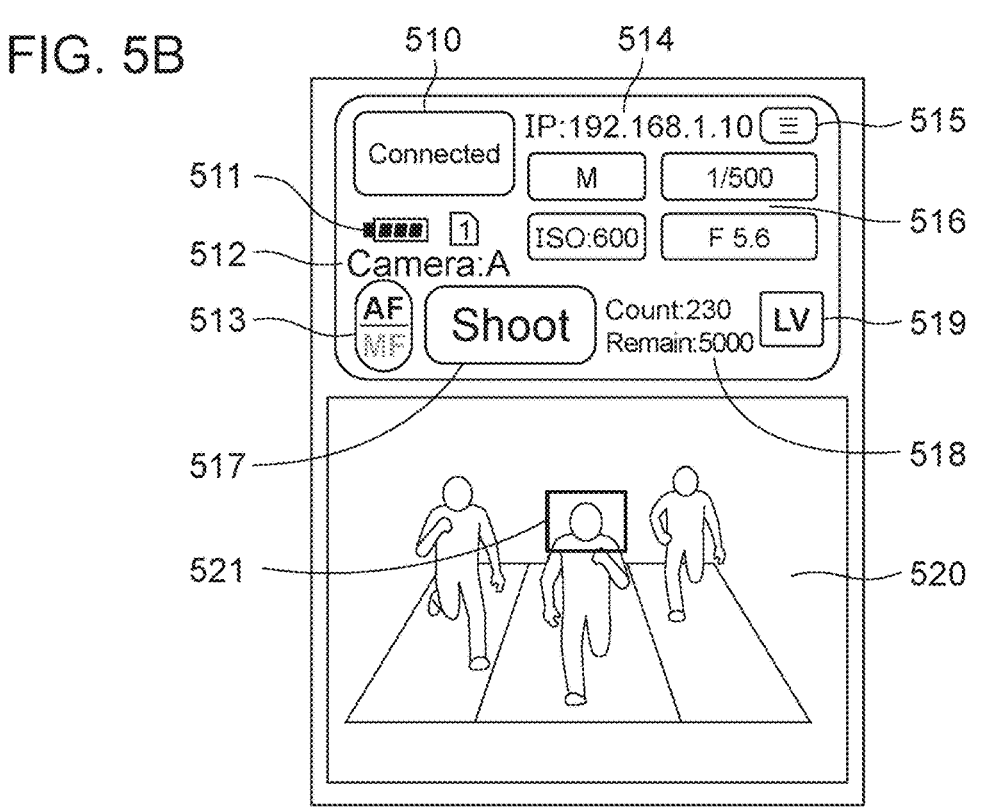
FIG. 5B illustrates an example of the screen of the control device according to the first embodiment.

FIG. 5B illustrates the configuration of the individual camera control member group 501.

The individual camera control member group 501 includes an operational member 510, a display region 511, and a name display region 512. The operational member 510 is for controlling the connection state of the digital camera 100. The display region 511 indicates the power state of the digital camera 100 and the status of a recording member. The name display region 512 is for identifying the individual camera. The status of a recording member is information regarding the current medium. The information regarding the current medium is a setting that defines, in a case where a plurality of cards, such as an SD card or a CF card, can be inserted into the camera, which recording medium will be used for recording when a new image is generated. The information regarding the current medium is a setting stored in the digital camera 100. When connecting to the digital camera 100, the control device 200 acquires information regarding the power state and current medium and camera name information from the digital camera 100 and reflects the information in the display of the display regions 511 and 512.

Furthermore, the individual camera control member group 501 includes a display operational member 513 for displaying the status of auto and manual focus and for switching between the focus settings. Furthermore, the individual camera control member group 501 includes a display region 514 and an operational member 515. The display region 514 displays the network address of the digital camera 100. The operational member 515 is for setting various settings for individual camera control.

Furthermore, the individual camera control member group 501 includes an operational member group 516 for controlling the display and change of the image capturing settings of the digital camera 100. Furthermore, the individual camera control member group 501 includes an operational member 517 and a display member 518. The operational member 517 performs remote shooting control (hereinafter referred to as "remote shooting") on the digital camera 100 individually. The display member 518 indicates the remaining number of images that can be captured and the total number of images captured by the digital camera 100. Furthermore, the individual camera control member group 501 includes a member 519 for controlling the live view display of the digital camera 100, a remote live display operational member 520, and an autofocus mode display member 521. Note that the display member 521 is not displayed in the case of manual focus.

The photographer can switch the focus setting between autofocus and manual focus using the display operational member 513 of the individual camera control member group 501 illustrated in FIG. 5B. Through the display mode of this display operational member 513, the current camera focus setting can be confirmed. Note that the focus setting in this case is not information recorded in the non-volatile memory 103 of the camera 100 but information recorded in the non-volatile memory 203 of the control device 200 using the function of the remote application. The remote application determines, in response to reception of a user operation performed on this display operational member 513, whether a focus drive instruction to be transmitted to each camera when an image capturing instruction is transmitted is to be an instruction for driving or an instruction for not driving. The information regarding the presence or absence of drive focus determined in this case is distinguished for each camera to be controlled and is held in the non-volatile memory 203 of the control device 200.

Figure 5C:
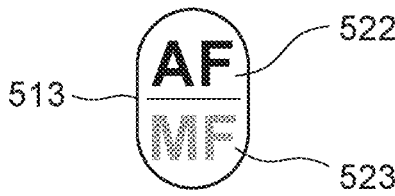
FIG. 5C illustrates an example of the screen of the control device according to the first embodiment.
Figure 5D:
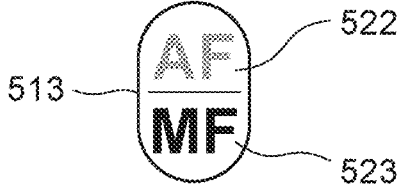
FIG. 5D illustrates an example of the screen of the control device according to the first embodiment.
Figure 5E:
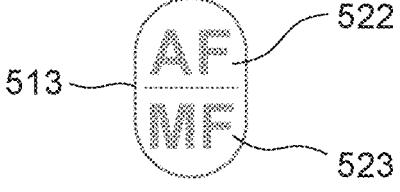
FIG. 5E illustrates an example of the screen of the control device according to the first embodiment.

FIGS. 5C, 5D, and 5E illustrate the state change of the display operational member 513 in the individual camera control member group 501. The display operational member 513 displays the status of autofocus and manual focus and for switching the focus setting between autofocus and manual focus.

FIG. 5C illustrates the state where the control device 200 is set to command the digital camera 100 to capture images with autofocus when issuing a remote shooting command to the digital camera 100. In that case, a display member 522 indicating autofocus becomes an indication of effectiveness, and a display member 523 indicating manual focus becomes an indication of ineffectiveness. An indication of effectiveness can be displayed in a manner that is easier to catch the user's attention than an indication of ineffectiveness. For example, an indication of effectiveness is displayed in colored text, while an indication of ineffectiveness is displayed in a grayed-out state.

FIG. 5D illustrates the state where the control device 200 is set to command the digital camera 100 to capture images with fixed focus when issuing a remote shooting command to the digital camera 100. In that case, the display member 522 indicating autofocus becomes an indication of ineffectiveness, and the display member 523 indicating manual focus becomes an indication of effectiveness.

Note that the display mode of the operational member displaying the focus setting in the remote shooting illustrated in the present embodiment is an example, and it is sufficient if the setting state is conveyed to the user in a recognizable form.

The user can switch the display between FIG. 5C and FIG. 5D by mouse clicking or touching the display region of the display operational member 513. As a result, the setting as to the presence or absence of focus drive can be switched accordingly. For example, even in the case of the composition illustrated in FIG. 4A, there may be a situation where it is recognized that the intended photo can be captured using fixed focus, such as when the subject 401 is moving fast. Even in such a case, by operating the display operational member 513 illustrated in FIG. 5B, the control device 200 can remotely switch the focus setting of the digital camera 100 from autofocus to fixed focus to enable smooth image capture.

Figure 5F:
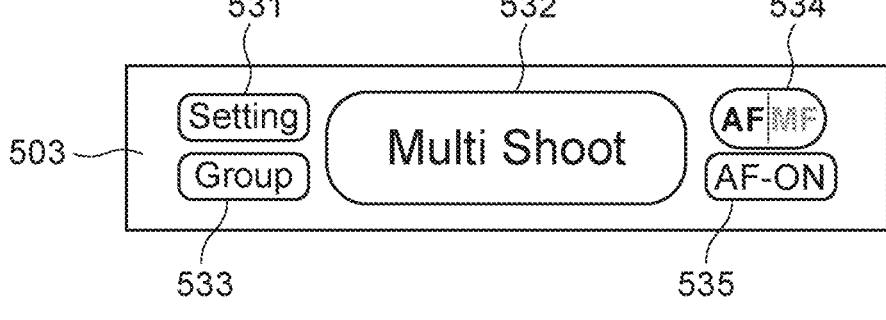
FIG. 5F illustrates an example of the screen of the control device according to the first embodiment.

FIG. 5F illustrates the configuration of the multi-camera control member 503.

The multi-camera control member 503 is composed of members that command the plurality of digital cameras 100 at once.

Specifically, the multi-camera control member 503 includes an operational member 531 and an operational member 532. The operational member 531 sets and controls image capturing parameters at once. The operational member 532 is for issuing a multi-remote shooting command. This operational member 532 is a member for transmitting a shooting command to a plurality of digital cameras at once. As illustrated in FIG. 5A, this operational member 532 is displayed larger than the operational member 517 described above. This allows the user to intuitively grasp that the member is designed to send an instruction to a plurality of cameras rather than a single camera. Moreover, as illustrated in FIG. 5A, this operational member 532 is displayed under the region where live view images are displayed. The operational member 532 is displayed along with the operational members 515 on the same screen, with the operational member 532 positioned below and the operational members 515 positioned above the live view image. This can prevent a mis-operation.

Figure 5G:
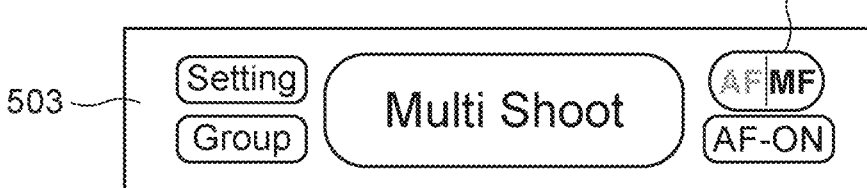
FIG. 5G illustrates an example of the screen of the control device according to the first embodiment.
Figure 5H:
FIG. 5H illustrates an example of the screen of the control device according to the first embodiment.
Figure 5I:
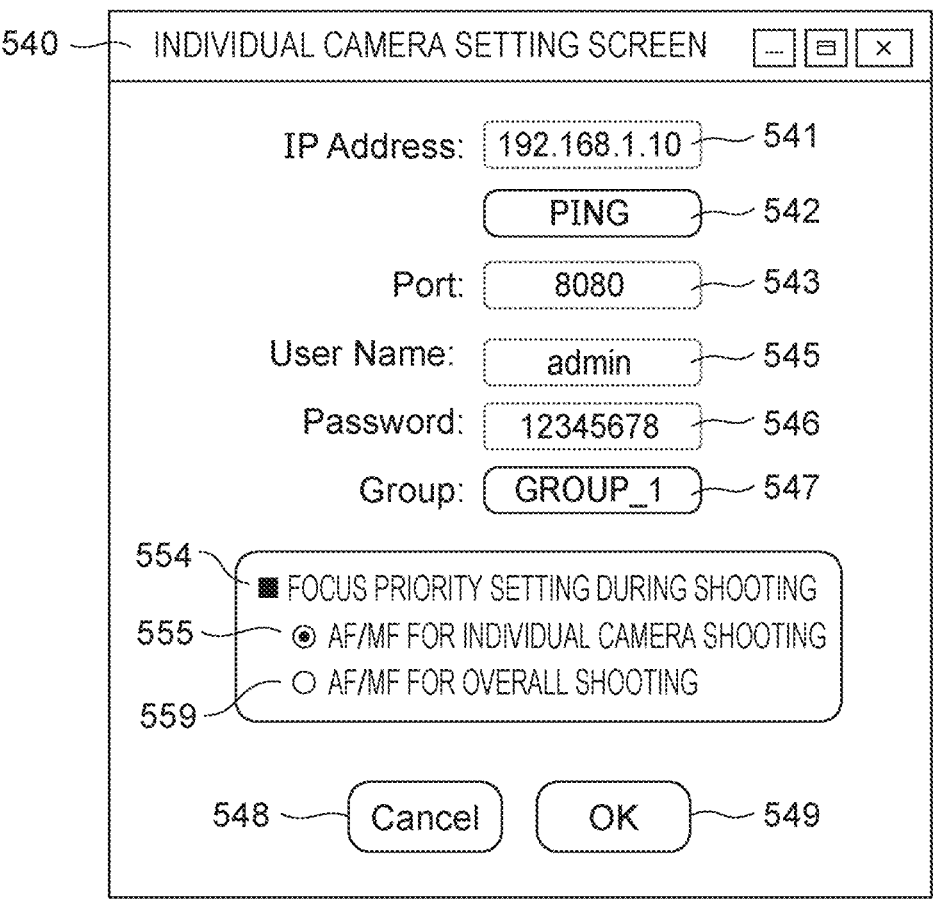
FIG. 5I illustrates an example of the screen of the control device according to the first embodiment.
Figure 5J:
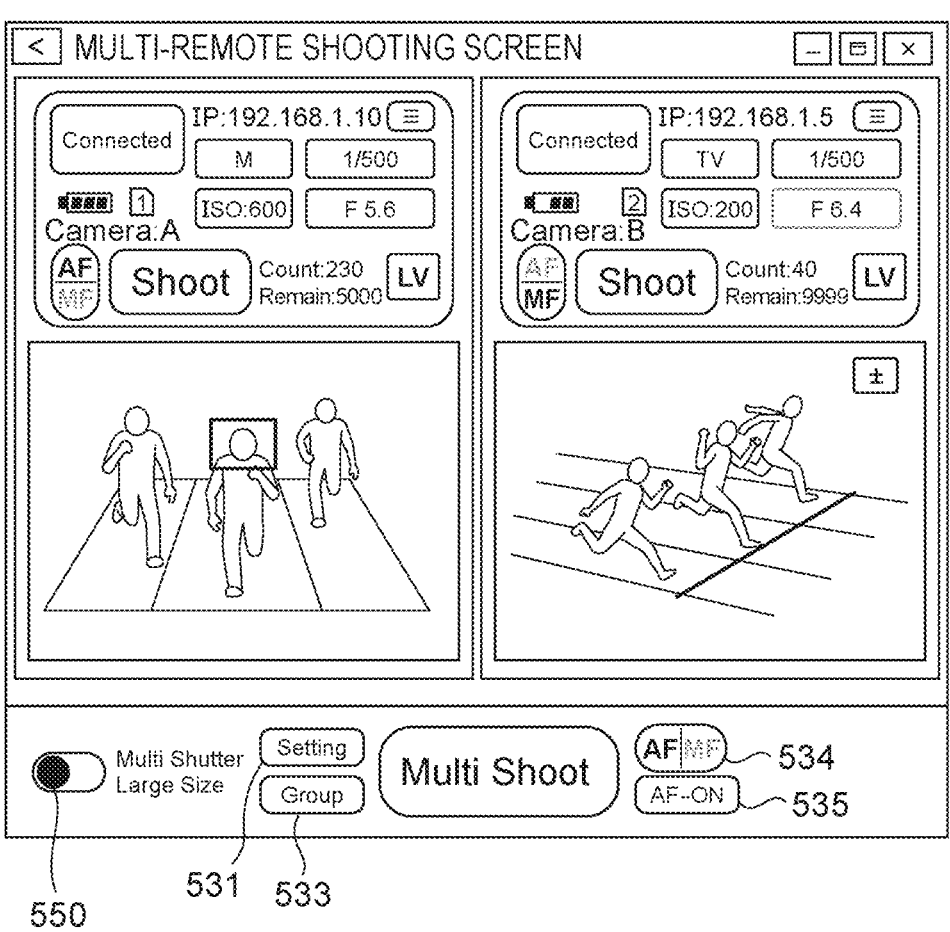
FIG. 5J illustrates an example of the screen of the control device according to the first embodiment.

Note that the multi-camera control member 503 may be provided with a switch member 550 (hereinafter also referred to as an operational member 550) that can change the size of the operational member 532 for issuing a multi-remote shooting command, as illustrated in FIG. 5J. The switch member 550 illustrated in FIG. 5J indicates a switch state corresponding to a default display mode in which the operational member 532 for issuing a multi-remote shooting command is displayed in a relatively small size. In the present embodiment, this state is expressed as a switch OFF state. The switch can be turned on by the user touching the display region of the switch member 550.

Figure 5K:
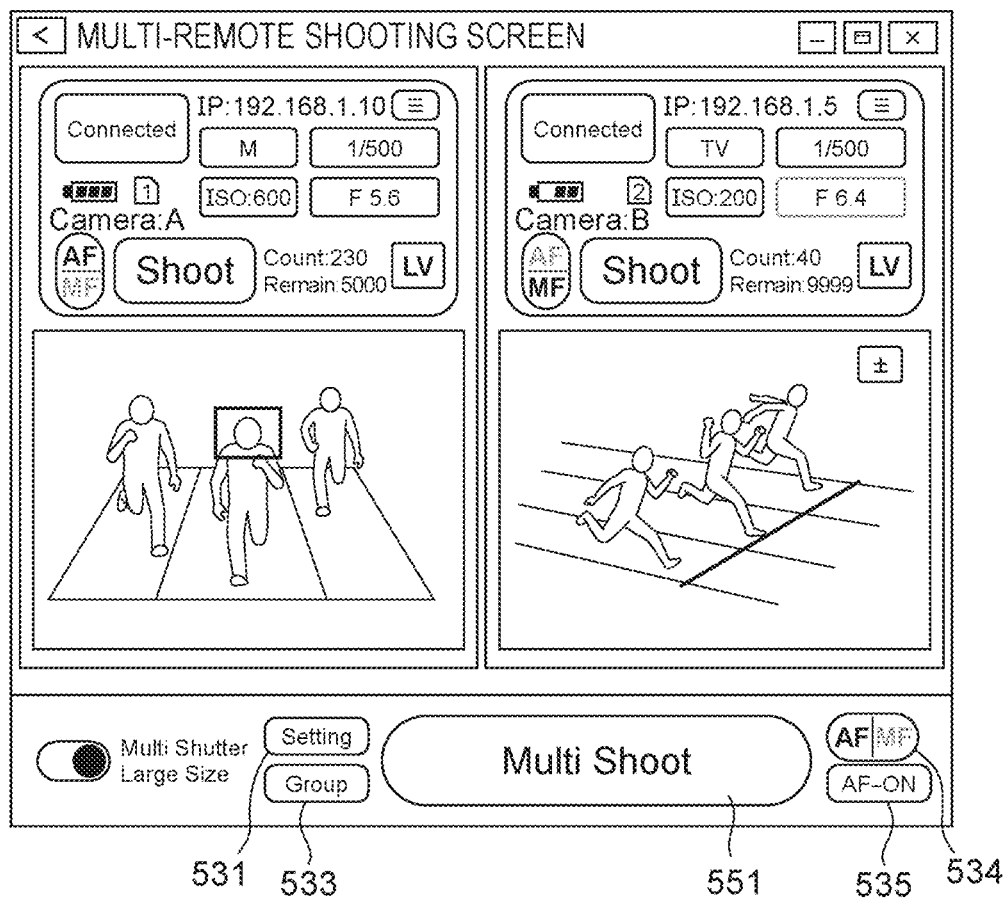
FIG. 5K illustrates an example of the screen of the control device according to the first embodiment.

FIG. 5K illustrates a state where the switch member 550 is turned on. In this case, the operational member 532 for issuing a multi-remote shooting command is displayed in a large size like an operational member 551. The touch region for receiving an instruction as to a multi-remote shooting command is also enlarged like the display region of the operational member 551. Thus, it is easier for the user to input a touch operation to the operational member 551 for issuing a multi-remote shooting command.

Note that, in this case, the sizes of the other operational members 531, 533, 534, and 535 remain the same (or are increased at ratios lower than that for the operational member 551). Therefore, it is relatively easier to input a multi-remote shooting command compared to other operations.

In this manner, by changing the display size to a larger display size as in the case of the operational member 551, for example, even in a case where the user wants to input an instruction for multi-remote shooting while directly looking at the subject (that is, when the user is not looking at the screen), the possibility of failing to give the instruction can be reduced.

Moreover, the size of the region of the multi-camera control member 503 remains the same. That is, the sizes of the display regions of the individual camera control member groups 501 and 502 and the size of the display region of the live view image of each camera are not affected. Thus, the operability of individual operations performed while viewing the live view from each camera is not compromised.

Note that the display mode of the operational member 532 for issuing a multi-remote shooting command is not limited to the manner illustrated in FIG. 5K, and other display modes may also be used.

Figure 5L:
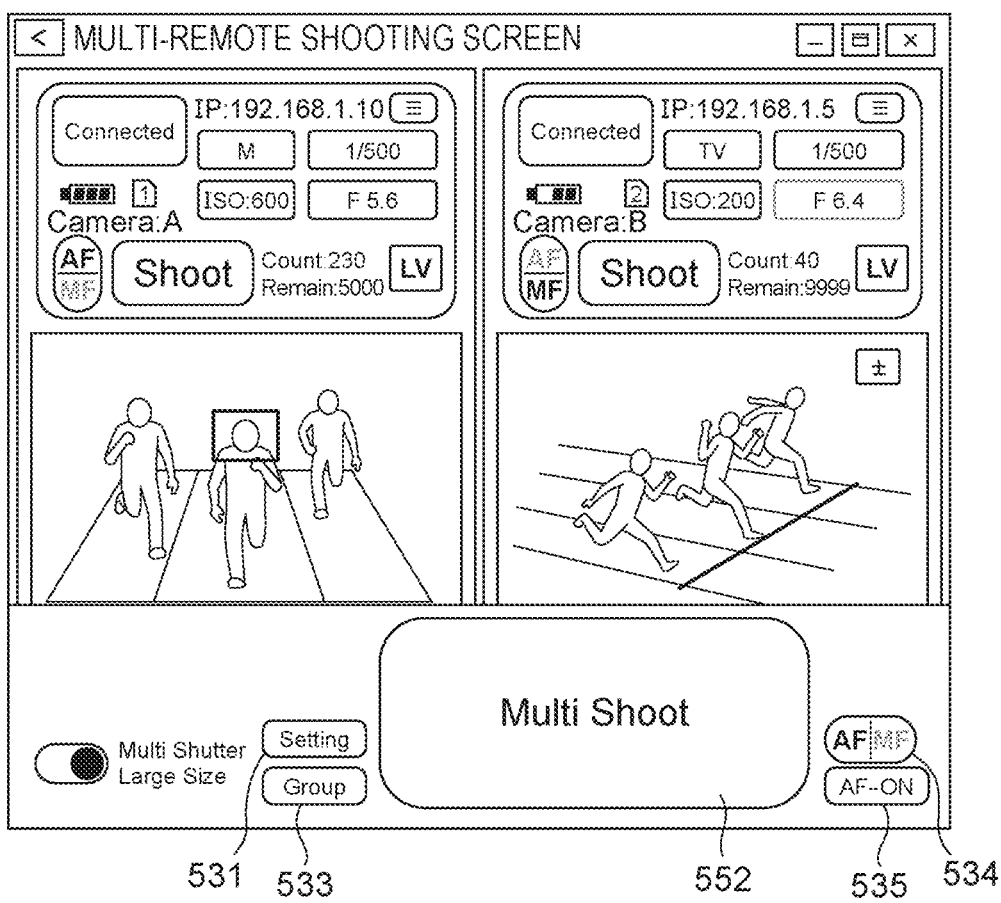
FIG. 5L illustrates an example of the screen of the control device according to the first embodiment.
Figure 5M:
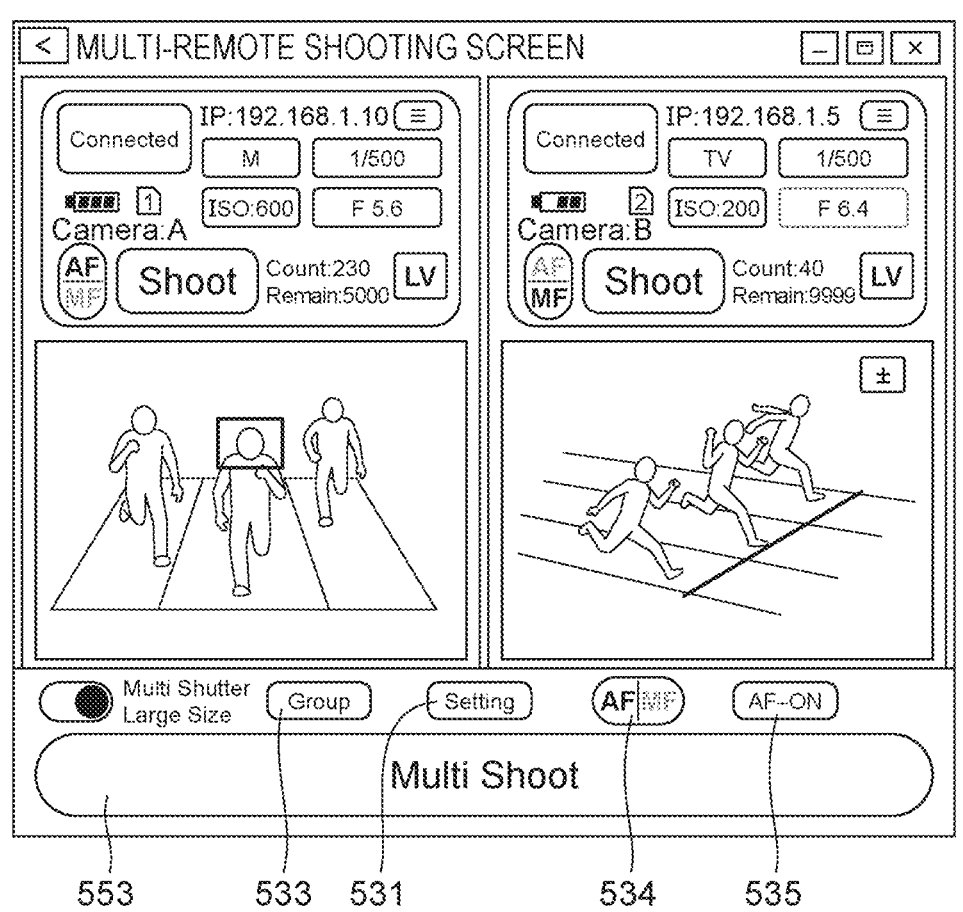
FIG. 5M illustrates an example of the screen of the control device according to the first embodiment.

For example, as illustrated in FIGS. 5L and 5M, the regions of the multi-camera control members 503 may be enlarged in the vertical direction, and the operational members for issuing a multi-remote shooting command may be displayed larger than the operational member 551 illustrated in FIG. 5K. Even in this case, the sizes of the other operational members 531, 533, 534, and 535 remain the same (or are increased at ratios lower than that for the operational member 551). In a case where display is performed as in FIG. 5L, an operational member 552 for issuing a multi-remote shooting command is wider in the vertical direction than the operational member 532 for issuing a multi-remote shooting command. Thus, the possibility of failing to issue a multi-remote shooting command due to the vertical misalignment of the operating finger can be reduced. In a case where display is performed as in FIG. 5M, an operational member 553 for issuing a multi-remote shooting command is wider in the horizontal direction than the operational member 532 for issuing a multi-remote shooting command. Thus, the possibility of failing to issue a multi-remote shooting command due to the horizontal misalignment of the operating finger can be reduced. Furthermore, other operational members are not displayed in the horizontal direction of the operational member 553 in the entire display region, and thus the operational member 553 for issuing a multi-remote shooting command can be displayed almost up to the left and right edges of the screen. This provides the display mode that facilitates, for example, both inputting a multi-remote shooting command using the right thumb when the device is held in the right hand, and inputting a multi-remote shooting command using the left thumb when the device is held in the left hand. That is, it is easy to input a multi-remote shooting command even with a single hand, either the right or left hand, holding the device. Moreover, in this case, by increasing the region of the multi-camera control member 503 to the extent that the display regions of the individual camera control member groups 501 and 502 are not significantly affected, only the contact response region of the operational member 532 can be enlarged without compromising other operability. Therefore, it is easier for the photographer to perform multi-remote shooting operations while performing a smaller number of mis-operations than in the case of the display mode illustrated in FIG. 5K.

Figure 5N:
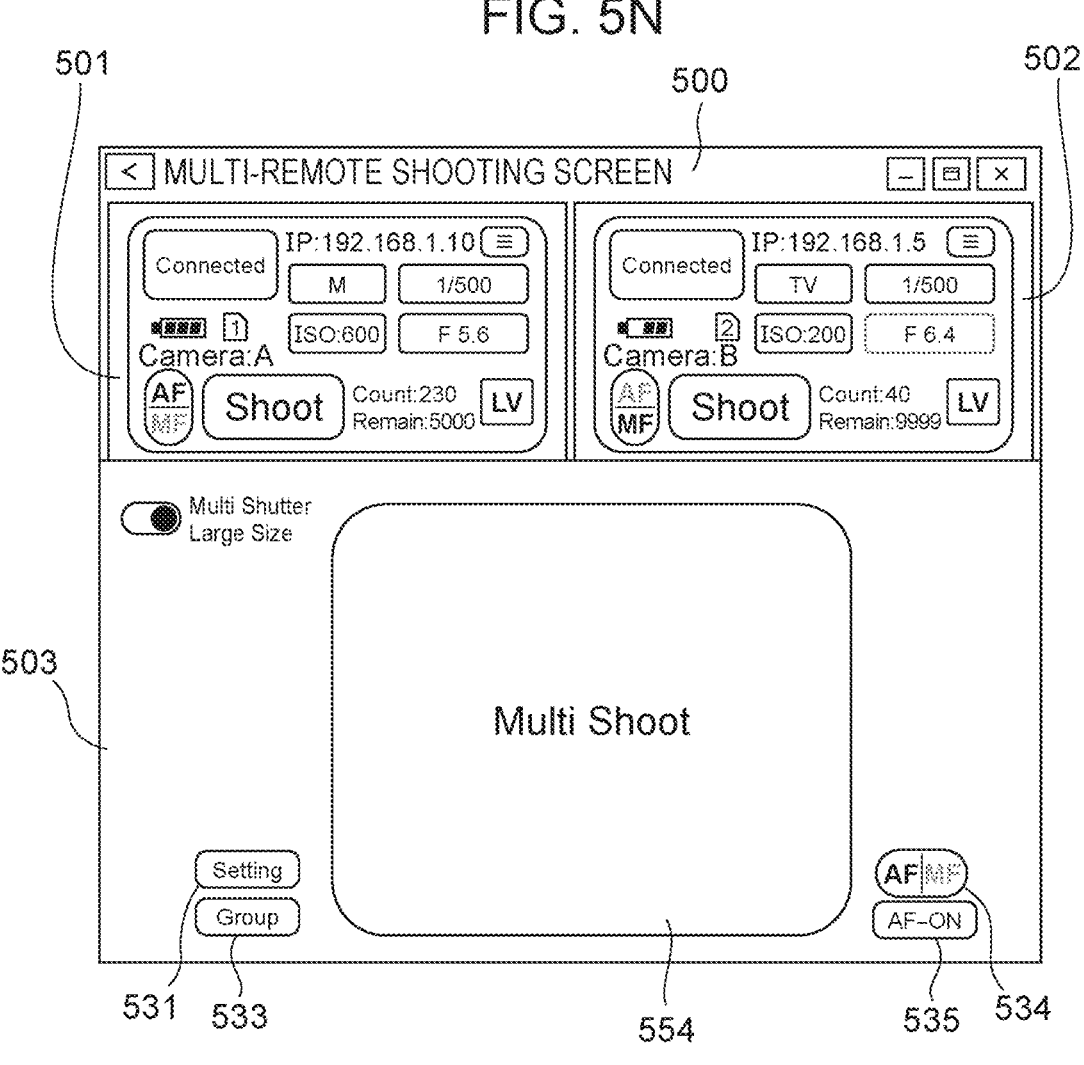
FIG. 5N illustrates an example of the screen of the control device according to the first embodiment.

Furthermore, as in FIG. 5N, the size of the operational member for issuing a multi-remote shooting command may be further increased. In such a case, the live view image from each camera is hidden by superimposing the operational member for issuing a multi-remote shooting command. However, in a scene where the user wants to display the operational member for issuing a multi-remote shooting command in a large size, the user is expected to see the subject directly and perform a touch operation on the screen without looking at the screen. Therefore, the operational member for issuing a multi-remote shooting command is designed to occupy a large area of the screen in order to prioritize avoiding the fatal problem of missing the timing of shooting due to a mis-operation, rather than the problem of not being able to see the live view image from each camera. In this way, the user can input a multi-remote shooting command by simply touching the screen without looking at the screen.

Furthermore, as illustrated in FIG. 5O, the size of the operational member for issuing a multi-remote shooting command may be further increased and superimposed on the live view image from each camera and displayed in a transparent manner so that the live view image from each camera can be seen. In such a case, operations that can be initiated by touching the live-view image are not acceptable. On the other hand, it is possible to achieve both the ease of inputting a multi-remote shooting command and the visual inspection of the live-view images.

Note that even in a case where the size of the operational member for issuing a multi-remote shooting command is changed and increased in the vertical direction as illustrated in FIGS. 5N and 5O, the operational member for issuing a multi-remote shooting command is displayed not to overlap the individual operational members of each camera.

Furthermore, not only the size but also the arrangement of the operational member for issuing a multi-remote shooting command may be made changeable.

For example, FIG. 5P illustrates an example of an arrangement where the operational member for issuing a multi-remote shooting command is moved to the right, and the other operational members are moved to the left. In such a case, it is easier for the user to input a multi-remote shooting command with their right thumb while holding the device in their right hand.

Figure 5Q:
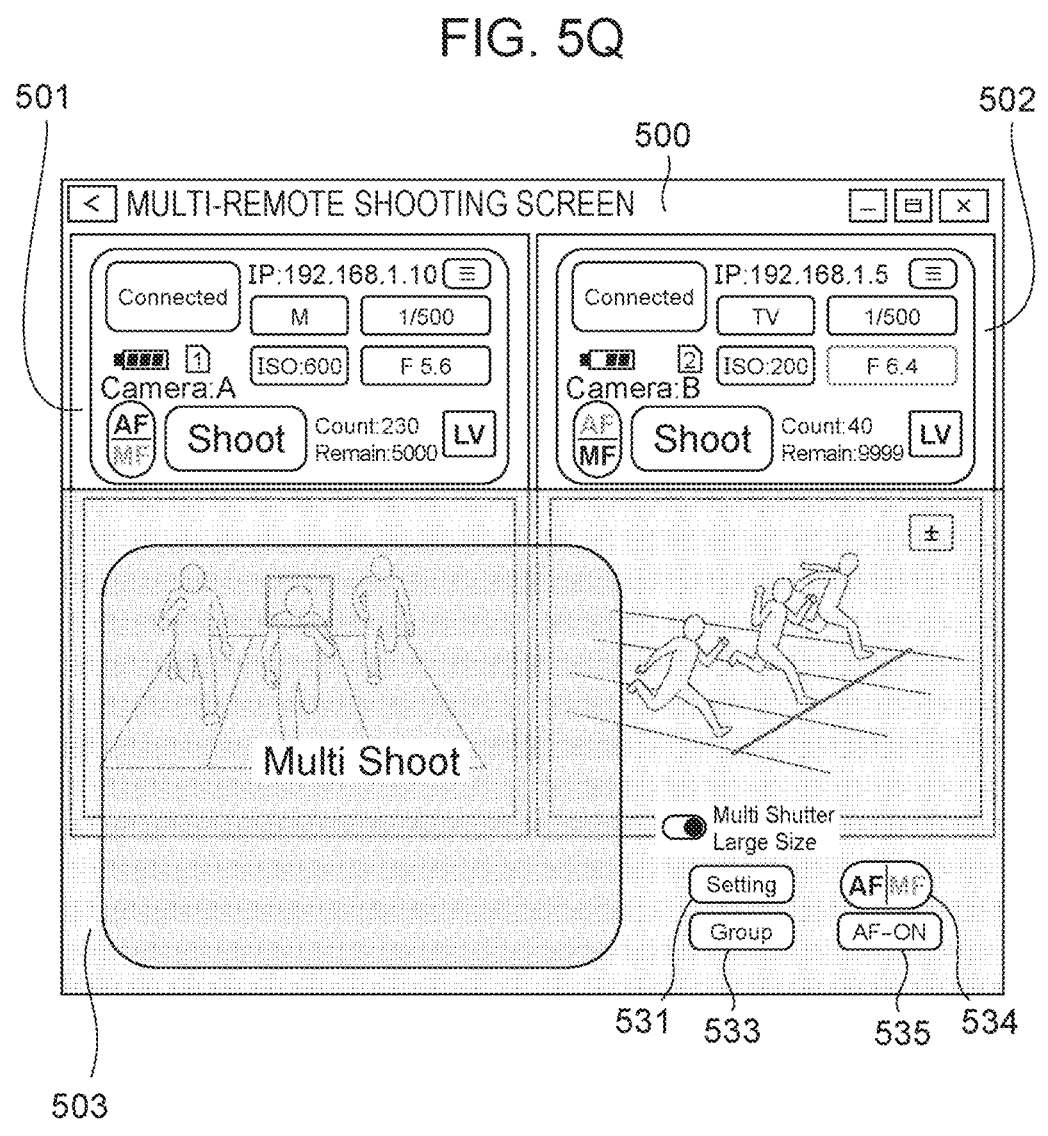

Moreover, FIG. 5Q illustrates an example of an arrangement where the operational member for issuing a multi-remote shooting command is moved to the left, and the other operational members are moved to the right. In such a case, it is easier for the user to input a multi-remote shooting command with their left thumb while holding the device in their left hand.

FIGS. 5P and 5Q are examples based on FIG. 5O; however, the change of arrangement can be applied even in a case where transparent display is not performed as in FIG. 5N and the display modes as in FIGS. 5K and 5L.

Moreover, each item of these operational members can be arranged and displayed by switching the display modes sequentially, for example. Alternatively, after changing the size of each item of these operational members, it may be made possible to change the arrangement of these operational members by a drag operation performed by the user.

Figure 5R:
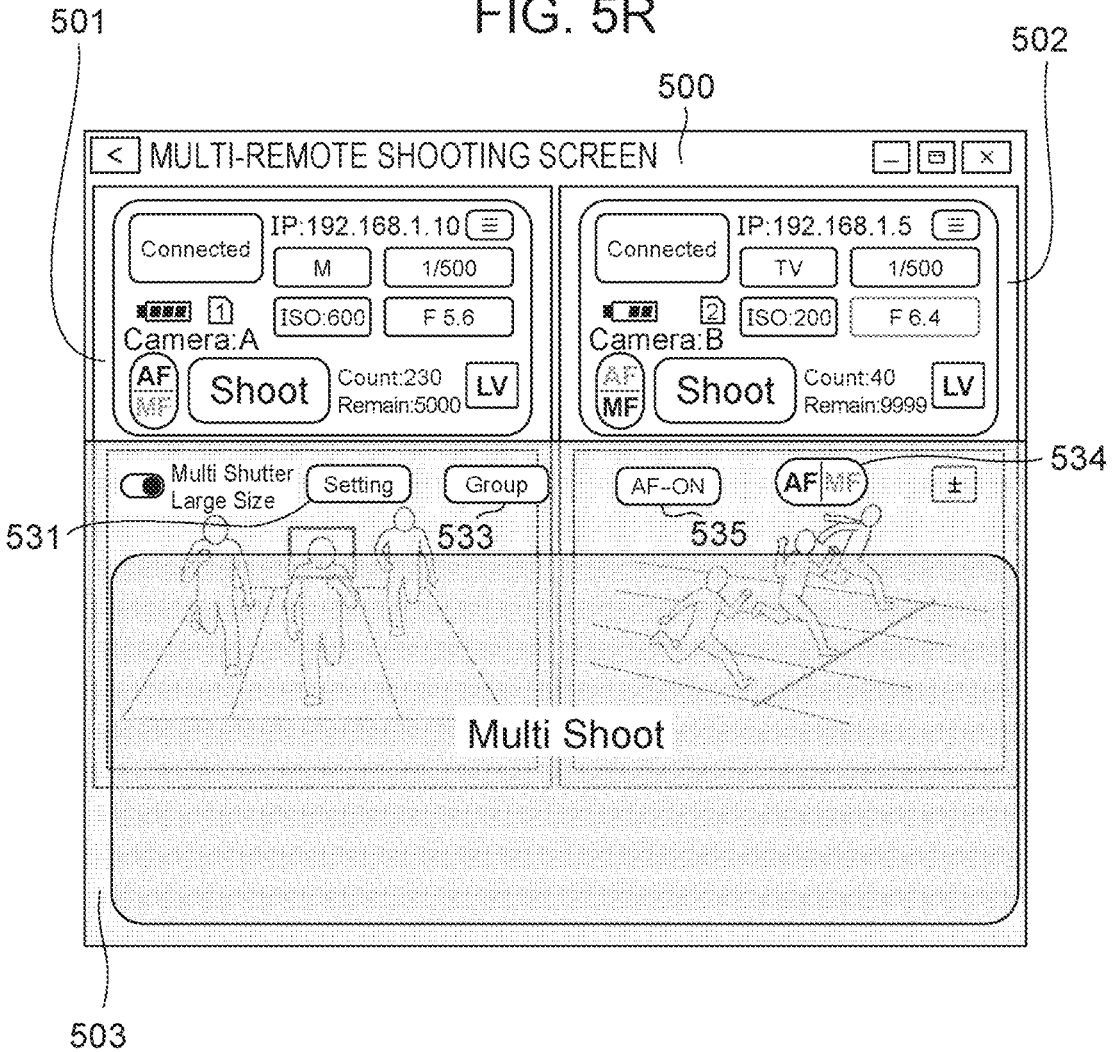
FIG. 5R illustrates an example of the screen of the control device according to the first embodiment.

Moreover, as illustrated in FIG. 5R, the display mode may be used in which while increasing the vertical width of the operational member for issuing a multi-remote shooting command, the operational member for issuing a multi-remote shooting command is enlarged in the horizontal direction up to positions close to the right and left edges. This approach improves one-handed operability while simultaneously dealing with the issue of vertical misalignment.

Figure 5S:
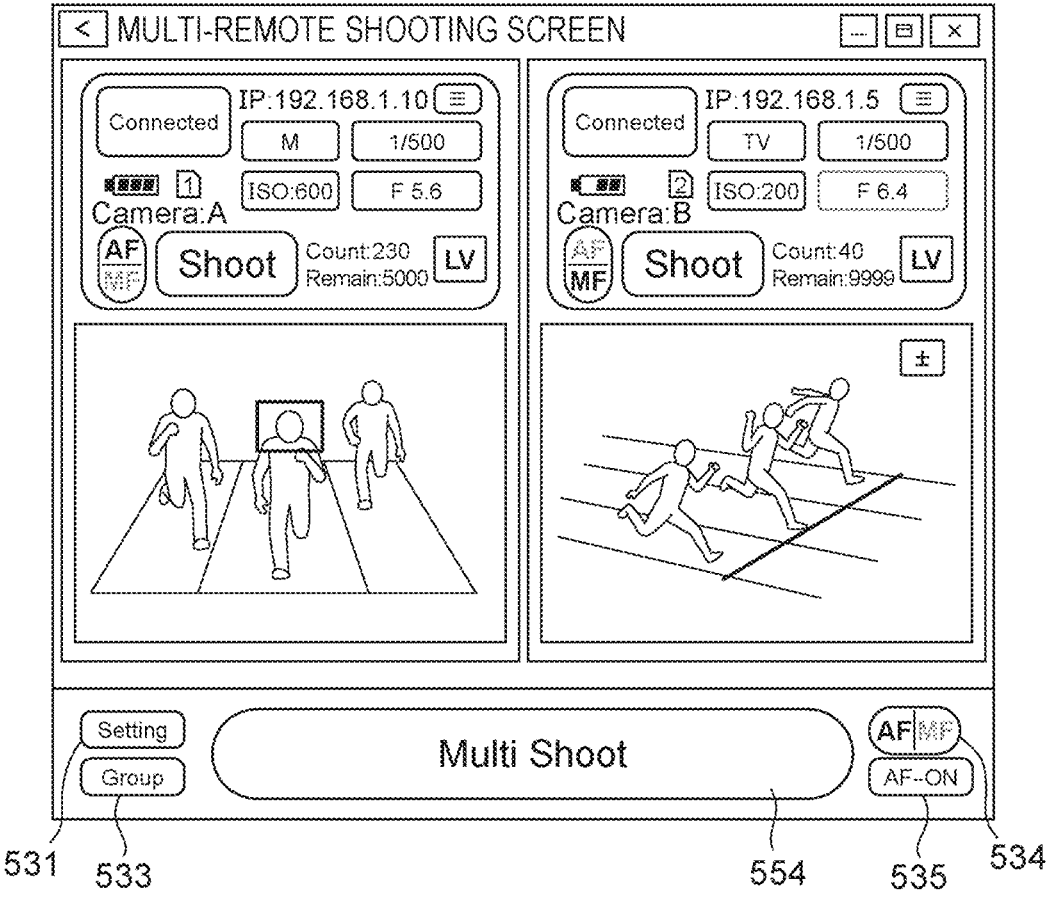
FIG. 5S illustrates an example of the screen of the control device according to the first embodiment.
Figure 5T:
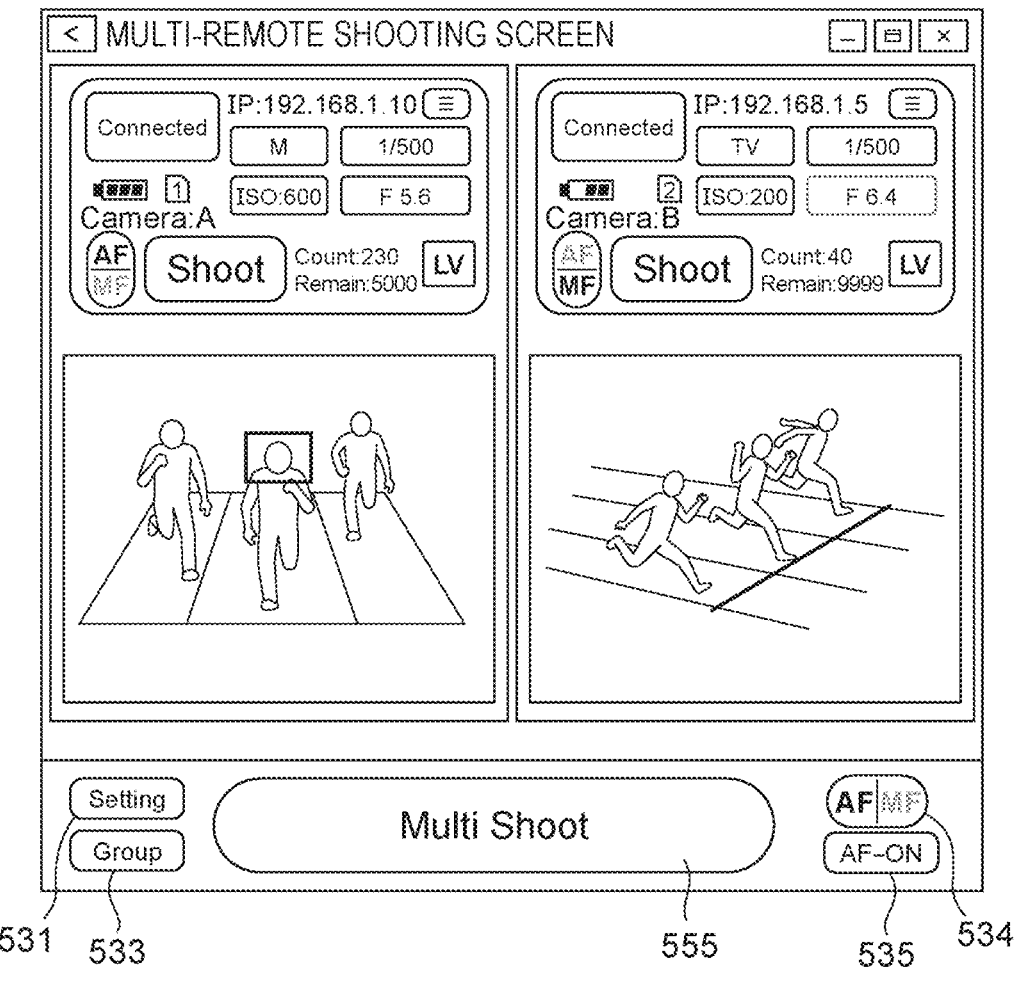
FIG. 5T illustrates an example of the screen of the control device according to the first embodiment.

Moreover, the size of the operational member for issuing a multi-remote shooting command may be automatically changed in accordance with the horizontal length of the multi-remote shooting screen 500. FIGS. 5S and 5T illustrate examples of display in which the operational member for issuing a multi-remote shooting command can be changed in accordance with the horizontal length of the multi-remote shooting screen 500. Compared with the horizontal length of the multi-remote shooting screen 500 in FIG. 5S, the horizontal length of the multi-remote shooting screen 500 in FIG. 5T is longer. Thus, the length of the operational member for issuing a multi-remote shooting command illustrated in FIG. 5T is displayed to be longer than that illustrated in FIG. 5S. In this way, the size of the operational member for issuing a multi-remote shooting command can be changed without the user having to operate the switch member 550 to change the size, thus saving the user the trouble of changing the size.

Figure 5U:
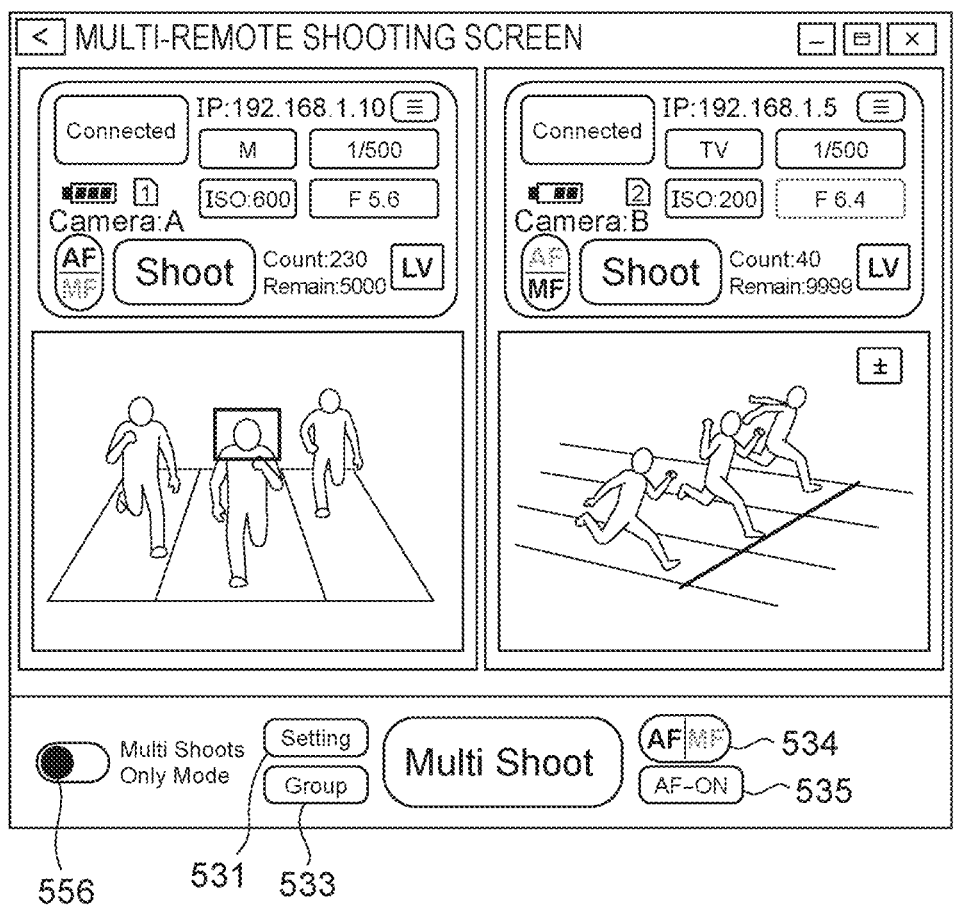
FIG. 5U illustrates an example of the screen of the control device according to the first embodiment.
Figure 5V:
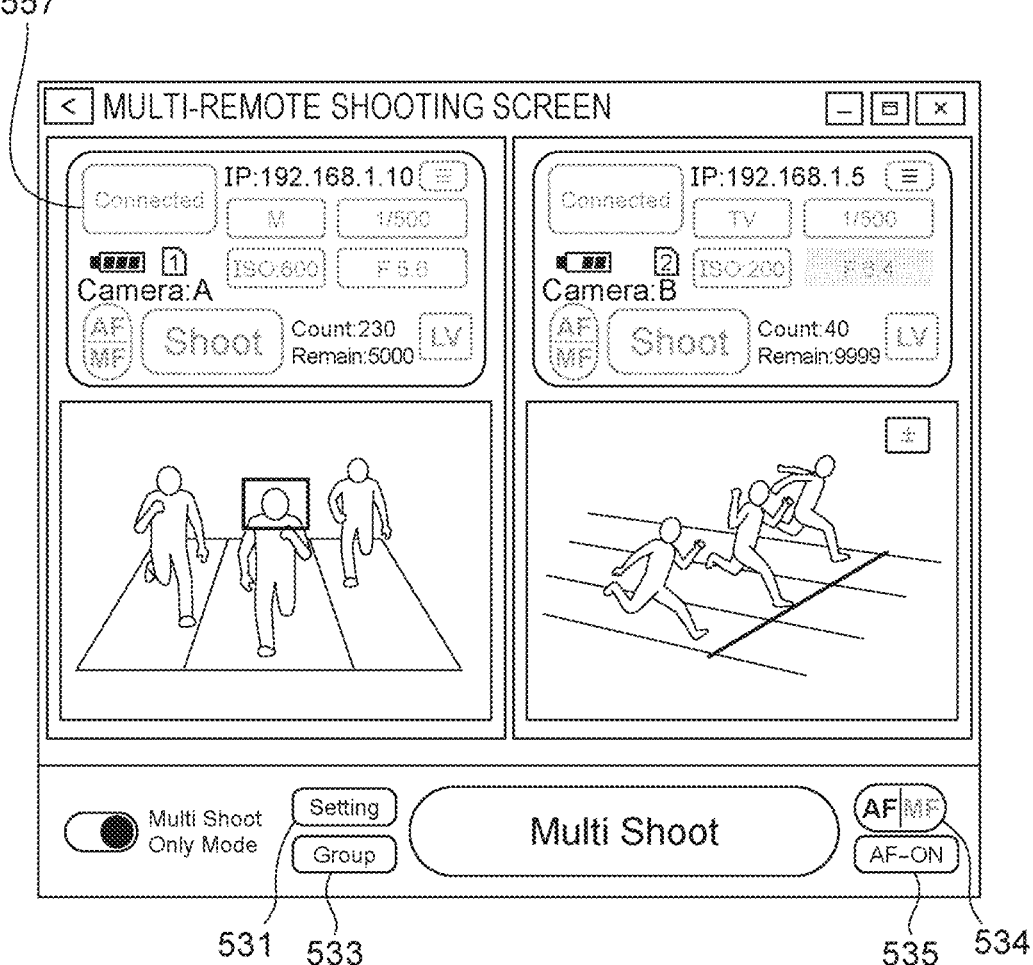
FIG. 5V illustrates an example of the screen of the control device according to the first embodiment.

Furthermore, in FIGS. 5U and 5V, a switch member 556 for switching to the state where only multi-camera control can be performed is provided. Switching the switch member 556 as in FIG. 5V enters the state where while increasing the size of the operational member for issuing a multi-remote shooting command, operational members 557 of the individual camera control member groups 501 and 502 are made inoperable. In the case illustrated in FIG. 5V, the operational members 557 of the individual camera control member groups 501 and 502 are grayed out, indicating that they are inoperable. Note that, in contrast, in a case where the operational members 557 are not grayed out, the operational members 557 are operable.

Unlike the use cases illustrated in FIGS. 5J to 5T, the use case illustrated in FIGS. 5U and 5V is designed for photographers who operate multi-remote shooting while visually observing a subject, which prevents the photographers from touching the control regions of the individual cameras and performing a mis-operation.

Furthermore, FIGS. 5U and 5V include the operational member 533 and the operational member 535. The operational member 533 selects a group when issuing a multi-remote shooting command, and the operational member 535 issues an autofocus command to the plurality of digital cameras 100 at once. Furthermore, FIGS. 5U and 5V include the operational member 534 (hereinafter also referred to as a display operational member). The display operational member 534 indicates the setting status of autofocus and fixed focus at the time when a multi-remote shooting command is issued.

The display operational member 534 is a member for selecting from among the following three operations about a command regarding the presence or absence of focus drive that is to be transmitted along with an image capturing instruction to be transmitted to the plurality of digital cameras 100 in response to a user operation performed on the operational member 532.

1. Send a command to capture images with autofocus (the display state of the display operational member 534 in FIG. 5F)
2. Send a command to capture images with fixed focus (the display state of the display operational member 534 in FIG. 5G)
3. Send a command to capture images in accordance with the focus setting for individual camera remote shooting (the display state of the display operational member 534 in FIG. 5H).

Note that for Setting Option 3, the setting indicated by the display operational member 513 in the individual camera control member group 501 illustrated in FIG. 5B is followed, and the display state indicates that the focus setting for the multi-remote shooting is disabled as illustrated in FIG. 5H. Every time the user operates the display operational member 534, the user can switch the settings sequentially in the order of FIGS. 5F to 5H.

Moreover, the operational member 535 is a button for causing all of the connected cameras to perform autofocus processing, regardless of the settings of the display operational members 513 and the display operational member 534. When this button is operated, an image capturing instruction is not transmitted, and an instruction regarding focus drive is transmitted to all of the connected cameras. This button is intended for use in situations where each camera is first focused on a place where focusing is possible, and fine-tuning of the focus is performed later.

Note that in a case where the autofocus or fixed focus setting at the time when a multi-remote shooting command is issued is enabled by the display operational member 534, the focus setting may be different from the focus settings of the individual cameras.

Therefore, in order to avoid unintentional focus drive by the user when images are captured using the plurality of digital cameras 100, an individual camera setting screen 540 allows focus priority during shooting to be set. The setting method will be described later.

Note that the display mode of the display operational member for the focus setting in the multi-remote shooting indicated in the present embodiment is an example, and it is sufficient if the state of the setting is conveyed to the user in a recognizable form.

FIG. 5I illustrates the individual camera setting screen 540 starting upon connecting to the digital camera 100. The individual camera setting screen 540 sets individual camera settings.

The individual camera setting screen 540 includes an operational member 541 and an operational member 542. The operational member 541 sets the IP address of the digital camera 100. The operational member 542 confirms whether the digital camera 100 is present on the network by sending out a PING command from the control device 200. Furthermore, the individual camera setting screen 540 includes an operational member 543, a user name setting operational member 545, and a password setting operational member 546. The operational member 543 sets the Port number of the digital camera 100. The user name setting operational member 545 and the password setting operational member 546 are for logging into the digital camera 100. Furthermore, the individual camera setting screen 540 includes an operational member 547, an operational member 548, and an operational member 549. The operational member 547 sets which group the digital camera 100 is to belong to. The operational member 548 cancels the settings. The operational member 549 determines the settings. Furthermore, the individual camera setting screen 540 includes an operational member 554 that determines focus priority for when remote shooting is performed.

The operational member 554 that determines focus priority for when remote shooting is performed sets, for each camera, a focus priority setting related to focus in remote shooting. This avoids unintended focus behavior of the user at the time of image capturing using the plurality of digital cameras 100 in multi-remote shooting performed by the control device 200.

In a case where the user prioritizes the individual camera focus setting in multi-remote shooting, the user selects the operational member 554 that prioritizes the focus setting for individual camera shooting. In contrast, in a case where the focus setting for overall camera shooting is prioritized, it is sufficient that the user select a selection member 559 that prioritizes the focus setting for overall camera shooting. This make it possible to avoid unintended focus behavior in remote shooting for each camera.

In addition, in a state where the focus setting for overall camera shooting is set to be prioritized through this setting, the display operational member 513 is entirely disabled in a case where a focus drive instruction is to be transmitted along with an overall release instruction through an operation performed on the operational member 532 in multi-remote shooting.

In this case, as illustrated in FIG. 5E, the display operational member 513 is entirely grayed out. This is to avoid confusing the user due to the difference with the setting of the individual camera, and indicates that the setting of the individual camera is temporarily disabled.

For each camera, this display is canceled upon completion of the shooting processing (the display returns to that in FIG. 5C or 5D). Note that, in this case, the timing of the display returning varies depending on the processing speed of each camera. Generally, the timing gap for processing completion between cameras is not very long, practically nearly the same. However, it is conceivable that the slight difference in timing may cause apparent annoyance. In addition, there may be cases where the timing difference between cameras is effective, such as when the user wants to instruct the camera that has completed shooting to capture another image. However, these cases are practically negligible since the timing difference between the cameras is almost simultaneous.

Therefore, for example, it is possible to wait for a notification of completion of processing from each camera and return the display of each camera at the same timing upon completion of reception of completion notifications from all the cameras. In this case, the display is returned regardless of whether the notification from each camera indicates that processing was successful or unsuccessful at the camera.

Note that the screen illustrated in FIG. 5I is displayed not only when a connection is established but also by, for example, operating the operational member 515 illustrated in FIG. 5B.

Flowchart of Multi-Remote Shooting by Control Device 200

Figure 6A:
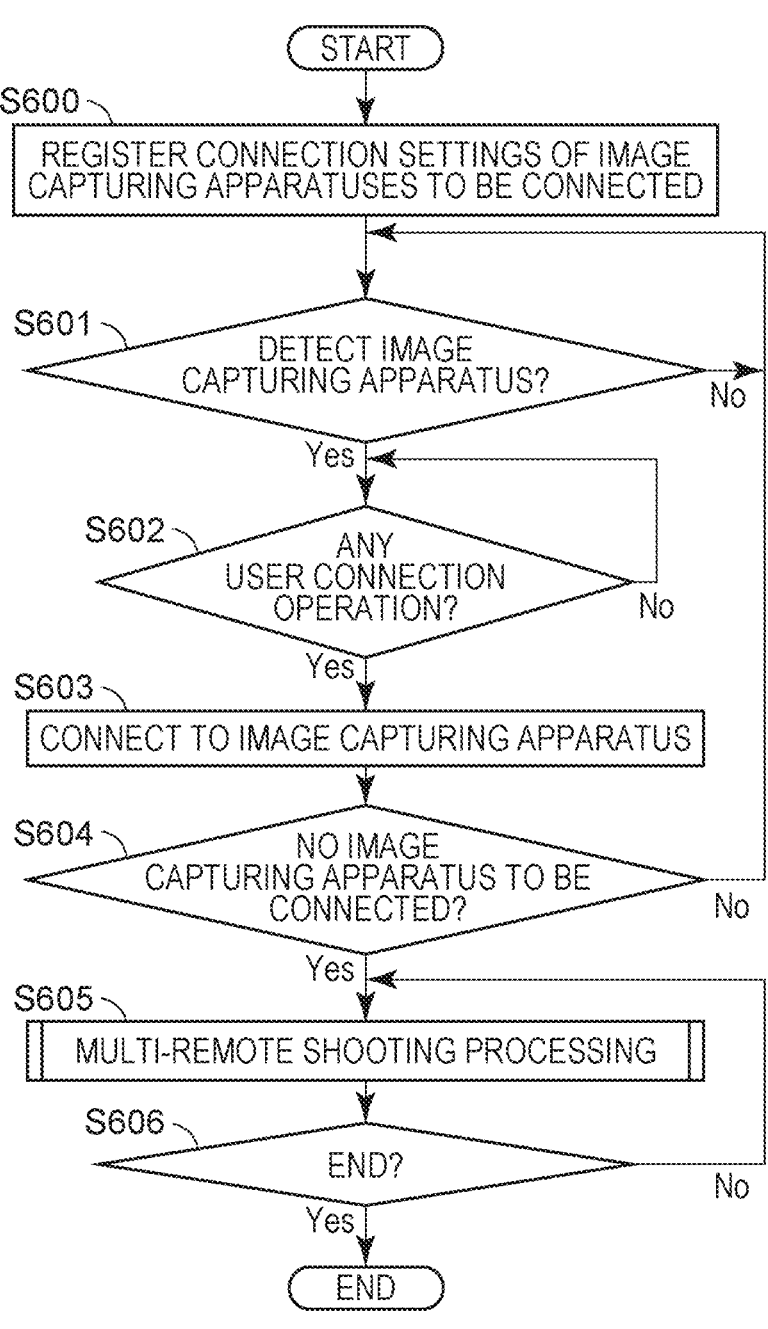
FIGS. 6A to 6C are flowcharts illustrating the operation of the control device according to the first embodiment.

Next, FIG. 6A illustrates a flowchart of processing according to the embodiment in which, for a plurality of digital cameras 100, the control device 200 performs focus drive control on each digital camera 100 at the time of multi-remote shooting.

The flowchart in FIG. 6A illustrates the procedure from when the control device 200 is connected to the plurality of digital cameras 100 to when multi-remote shooting is performed and completed. The processing in this flowchart is realized by the controller 201 of the control device 200 reading out a remote control application from the non-volatile memory 203, loading the remote control application into the working memory 204, and executing the remote control application.

This flowchart is initiated in response to receiving an operation to connect to the cameras through a menu that is not illustrated following the startup of the control device 200.

In Step S600, the connection settings of the plurality of digital cameras 100 to be connected to the control device 200 are registered, and the process proceeds to Step S601.

In Step S601, the controller 201 performs processing for detecting a digital camera 100 and determines whether a digital camera 100 is detected. In a case where a digital camera 100 is detected, the process proceeds to Step S602. In a case where a digital camera 100 is not detected, the process repeats Step S601.

In Step S602, the controller 201 determines whether the user has performed connection processing. In a case where it is determined that a connection request has been made, the process proceeds to Step S603. In a case where a connection request has not been made, the process repeats Step S602.

In Step S603, the controller 201 performs processing to connect to the detected digital camera 100 and establishes a connection with the digital camera 100, and the process proceeds to Step S604.

In Step S604, the controller 201 determines whether multi-remote shooting can be started or not. In this step, when connections are established with all the digital cameras registered in Step S600 through processing performed in Steps S601 to S603, the controller 201 determines that multi-remote shooting can be started. In this case, in a case where multi-remote shooting can be started, the process proceeds to Step S605. In contrast, in a case where a camera that has not yet been connected is present among the cameras registered in Step S600, the controller 201 determines that it is not currently in a state to start multi-remote shooting. The process then returns to Step S601, and the processing in Steps S601 to S603 is repeated to establish connections with cameras that have not yet been connected.

In Step S605, the controller 201 performs multi-remote shooting processing, and the process proceeds to Step S606. The multi-remote shooting processing will be described below using FIG. 6B.

In Step S606, the controller 201 determines whether to end the process of this flowchart. Specifically, the controller 201 determines whether a command has been received from the user to disconnect from the plurality of digital cameras 100 and end multi-remote shooting. In a case where the controller 201 determines to end multi-remote shooting, the controller 201 ends the process of this flowchart. Otherwise, the process returns to Step S605.

Next, the multi-remote shooting processing in S605 will be described.

Figure 6B:
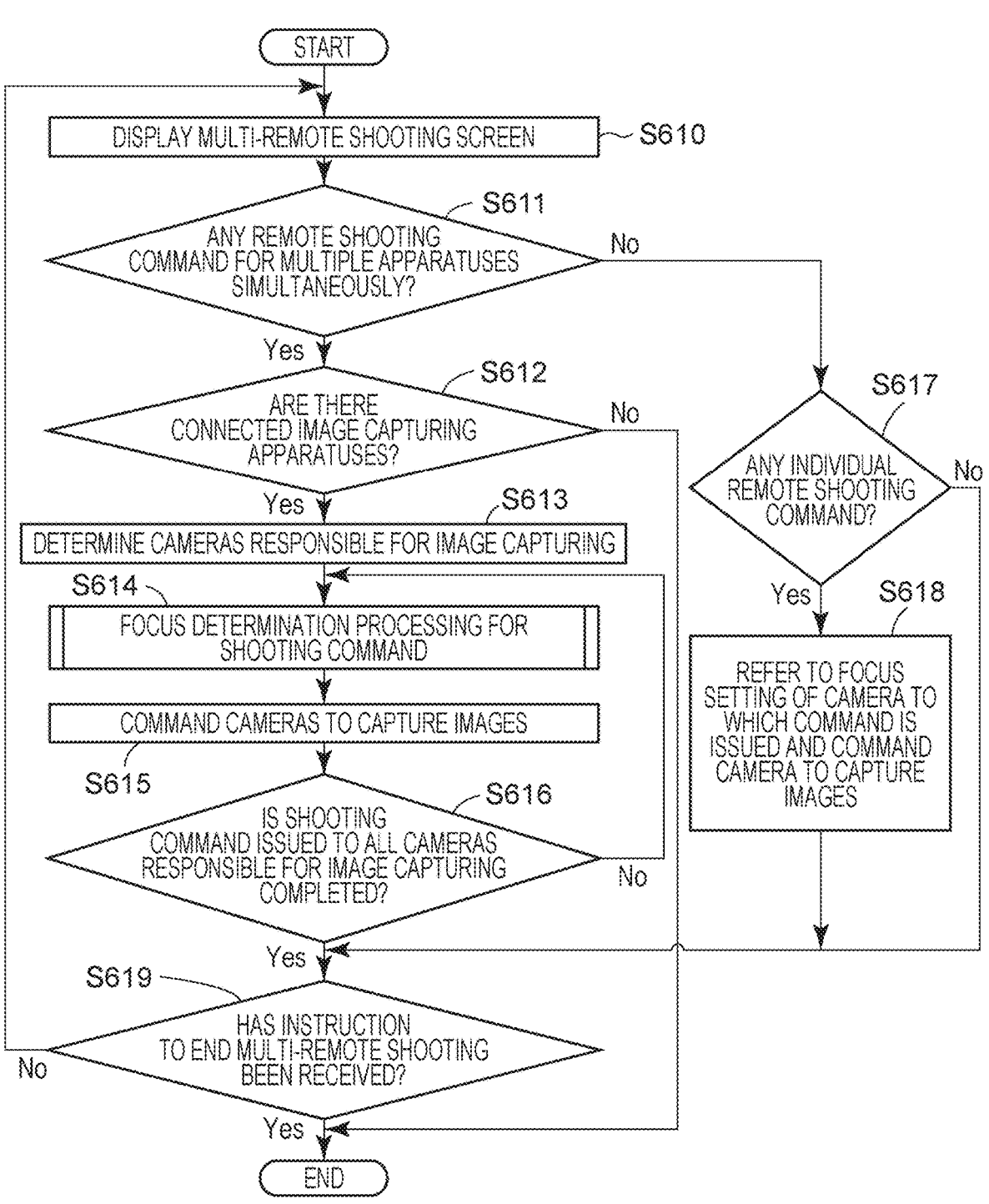

The flowchart of FIG. 6B illustrates the procedure of the multi-remote shooting processing in S605.

In Step S610, the controller 201 displays the multi-remote shooting screen illustrated in FIG. 5A, and the process proceeds to Step S611.

In Step S611, the controller 201 determines whether the user has made a multi-remote shooting request to the plurality of digital cameras 100. Specifically, the controller 201 determines whether an operation performed on the operational member 532 illustrated in FIGS. 5F to 5H has been accepted. In a case where a multi-remote shooting request is determined to have been made, the process proceeds to Step S612. Otherwise, the process proceeds to Step S617.

First, the case where the process has proceeded to Step S612 will be described.

In Step S612, the controller 201 checks whether the registered digital cameras 100 are connected. In a case where the registered digital cameras 100 are connected, the process proceeds to Step S613. In a case where the registered digital cameras 100 are determined to have been disconnected, the controller 201 ends the multi-remote shooting processing.

In Step S613, among the plurality of digital cameras 100 that are connected, the controller 201 checks the status of digital cameras 100 belonging to a group to be responsible for image capturing and capable of performing remote shooting. The controller 201 determines whether the digital cameras 100 are responsible for remote shooting, and the process proceeds to Step S614.

In Step S614, the controller 201 performs processing for determining focus drive control, and the process proceeds to Step S615. The processing for determining focus drive control will be described below using FIG. 6C.

In Step S615, the controller 201 commands the digital cameras 100 to perform remote shooting control along with focus control determined in Step S614, and the process proceeds to Step S616.

This command may be broadcast in the network, for example, with priority given to simultaneity. Alternatively, this command may be transmitted by multicast to each camera. This command may also be transmitted by unicast, with priority given to the assurance that the command is received.

In Step S616, the controller 201 determines whether the multi-remote shooting command issued to the digital cameras 100 responsible for image capturing determined in Step S613 has been completed. Specifically, the controller 201 determines whether a notification of completion of image capturing processing or a notification of failure of image capturing processing has been received from each digital camera 100 to which the shooting command has been transmitted.

In a case where the multi-remote shooting command has been completed, the process proceeds to Step S619. Otherwise, the process returns to Step S614.

Next, the case where the process has proceeded from Step S611 to Step S617 will be described.

In Step S617, the controller 201 determines whether an image capturing instruction to an individual camera has been received from the user. Specifically, the controller 201 determines whether an operation has been performed on the operational member 517 illustrated in FIG. 5B. In a case where an image capturing instruction to an individual camera is determined to have been received, the process proceeds to Step S618. Otherwise, the process proceeds to Step S619.

In Step S618, the controller 201 transmits, to the camera to be controlled through a display region where the operation has been received, an image capturing instruction and also a focus drive instruction in accordance with the focus setting set by the display operational member 513. From the digital camera 100 that has performed image capturing processing in response to this, the controller 201 receives a notification of completion of image capturing processing.

Thereafter, the process proceeds to Step S619.

In Step S619, the controller 201 determines whether an instruction to end multi-remote shooting has been received from the user. Specifically, for example, it is determined whether an attempt is made to transition to a screen that is not the multi-remote shooting screen, for example, by selecting the <button in the upper left corner of the multi-remote shooting screen window illustrated in FIG. 5A. In a case where an instruction to end multi-remote shooting is determined to have been received, the process of this flowchart ends. Otherwise, the process returns to S610.

Subsequently, the processing for determining focus drive control in Step S614 will be described.

Figure 6C:
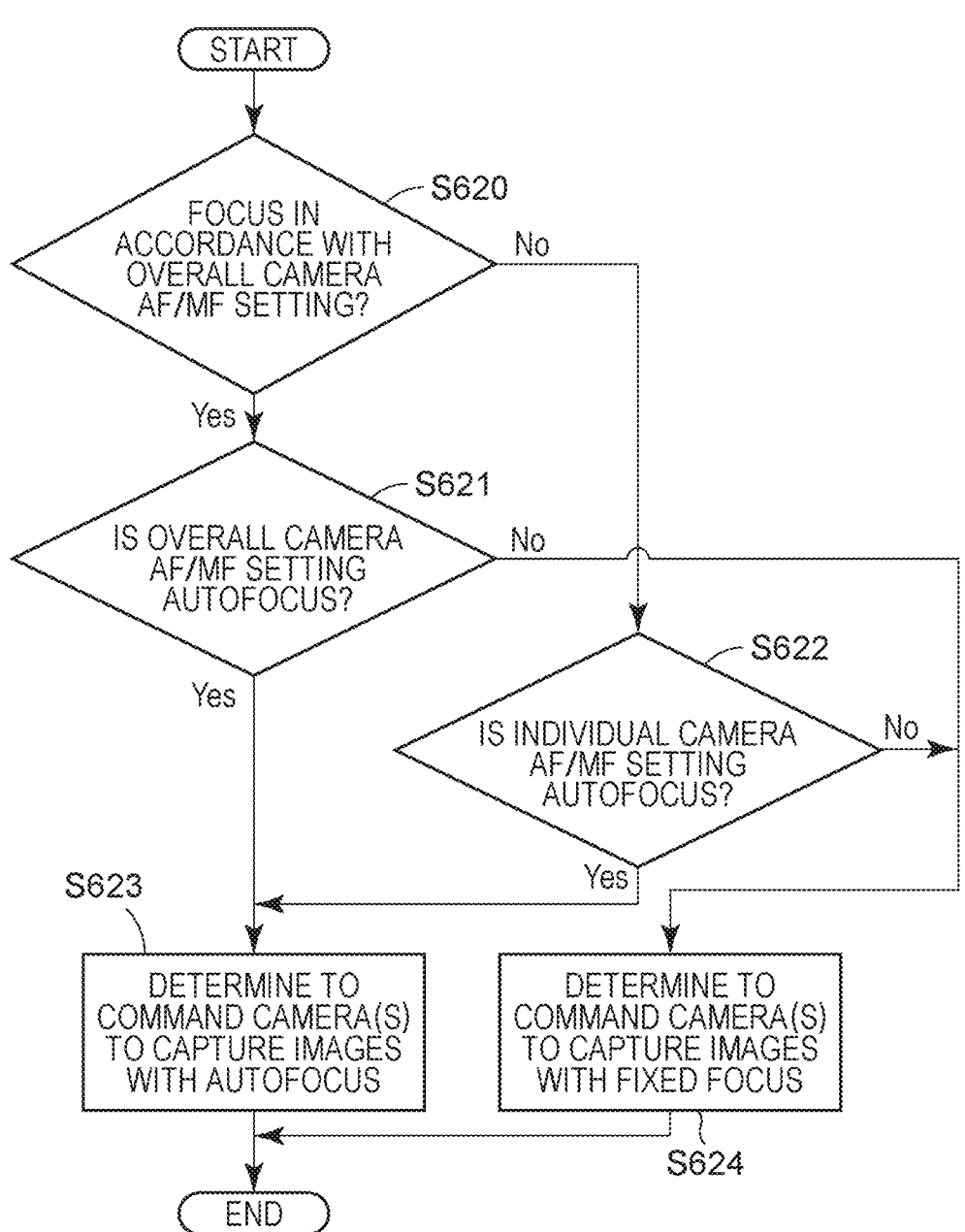

The flowchart illustrated in FIG. 6C indicates the procedure for determining focus drive control.

In Step S620, the controller 201 determines, as the focus priority during remote shooting, the priority between the focus setting for individual camera shooting and the focus setting for overall camera shooting. The focus priority during remote shooting is set by the user operating the operational member 550 on the individual camera setting screen 540.

In a case where the focus setting for individual camera shooting is prioritized, the process proceeds to Step S622. In a case where the focus setting for overall camera shooting is prioritized, the process proceeds to Step S621.

In Step S621, the controller 201 determines whether the focus setting for overall camera shooting set by the user indicates shooting with autofocus or shooting with fixed focus.

In a case where shooting is to be performed with autofocus, the process proceeds to Step S623. In a case where shooting is to be performed with fixed focus, the process proceeds to Step S624.

In Step S622, the controller 201 determines whether the focus setting for individual camera shooting set by the user indicates shooting with autofocus or shooting with fixed focus.

In a case where shooting is to be performed with auto-focus, the process proceeds to Step S623. In a case where shooting is to be performed with fixed focus, the process proceeds to Step S624.

In Step S623, the controller 201 determines to set the remote shooting focus setting for the digital camera(s) 100 to autofocus and ends the procedure.

In Step S624, the controller 201 determines to set the remote shooting focus setting for the digital camera(s) 100 to fixed focus and ends the procedure.

Flowchart of Shooting Processing of Digital Camera 100

Figure 7:
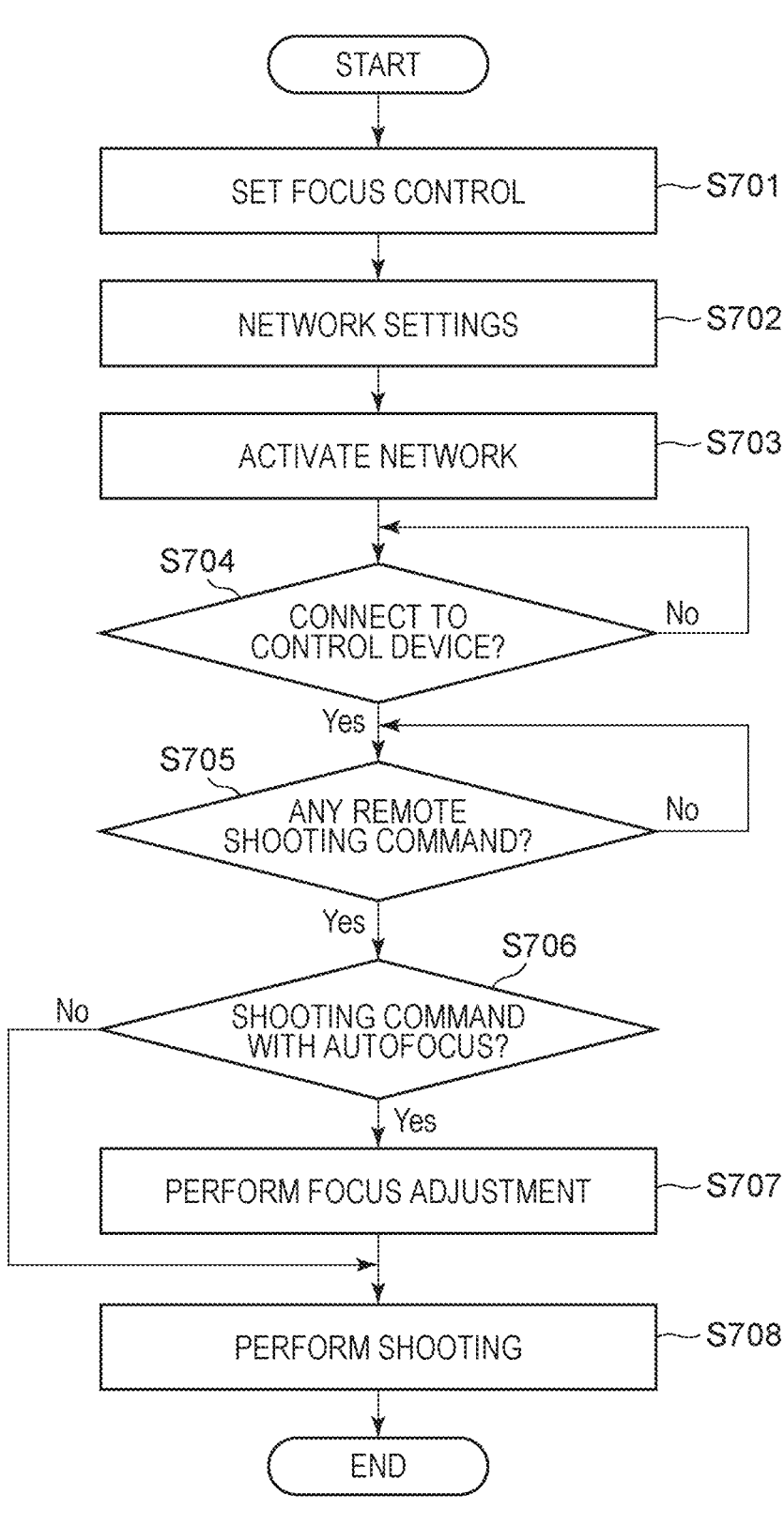
FIG. 7 is a flowchart illustrating the operation of the communication device according to the first embodiment.

FIG. 7 illustrates a flowchart from when a digital camera 100 receives a command from the connected control device 200 to when the digital camera 100 performs remote shooting in the present embodiment.

FIG. 7 starts from the state where the digital camera 100 is arranged at an image capturing position.

In Step S701, when the control unit 101 receives a remote shooting command from the control device 200, the controller 101 prepares the lens attached to the digital camera 100 such that shooting can be performed with autofocus drive and also with fixed focus, and the process proceeds to Step S702.

In Step S702, the controller 101 sets network settings to establish a connection to the control device 200, and the process proceeds to Step S703.

In Step S703, the controller 101 activates the network settings and waits for a connection to the control device 200, and the process proceeds to Step S704.

In Step S704, the controller 101 determines whether a connection request has been received from the control device 200. In a case where a connection request has been received, the process proceeds to Step S705. Otherwise, the process repeats Step S704, and the controller 101 waits for a connection request from the control device 200.

In Step S705, the controller 101 determines whether a remote shooting command has been issued from the control device 200 or not. In a case where a remote shooting command is confirmed, the process proceeds to Step S706. In a case where a remote shooting command was not issued, Step S705 is repeated and the controller 101 waits for a remote shooting command from the control device 200.

In Step S706, the controller 101 checks a focus drive control command for when shooting is to be performed that is received along with a remote shooting command from the control device 200. In a case where shooting is to be performed with autofocus, the process proceeds to Step S707. In a case where shooting is to be performed with fixed focus drive, the process proceeds to Step S708.

In Step S707, the controller 101 performs processing to focus on the subject, and the process proceeds to Step S708.

In Step S708, the controller 101 causes the digital camera 100 to perform shooting. Furthermore, upon completion of this shooting, the controller 101 transmits a completion notification to the control device 200, and the procedure ends.

As described above, in the first embodiment, by switching the focus setting of each camera between the individual camera setting and the overall camera setting in accordance with the priority setting, it is possible to use the different focus functions more in line with the user's intention.

Second Embodiment

Focus Drive Determination Based on Setting History

In the first embodiment, the individual camera focus setting and the overall camera focus setting are prioritized to capture images with focus intended by the user.

In contrast, in a second embodiment, a method will be described in which the control device 200 determines the focus setting for each camera in multi-remote shooting on the basis of an individual camera setting history.

Figure 8A:
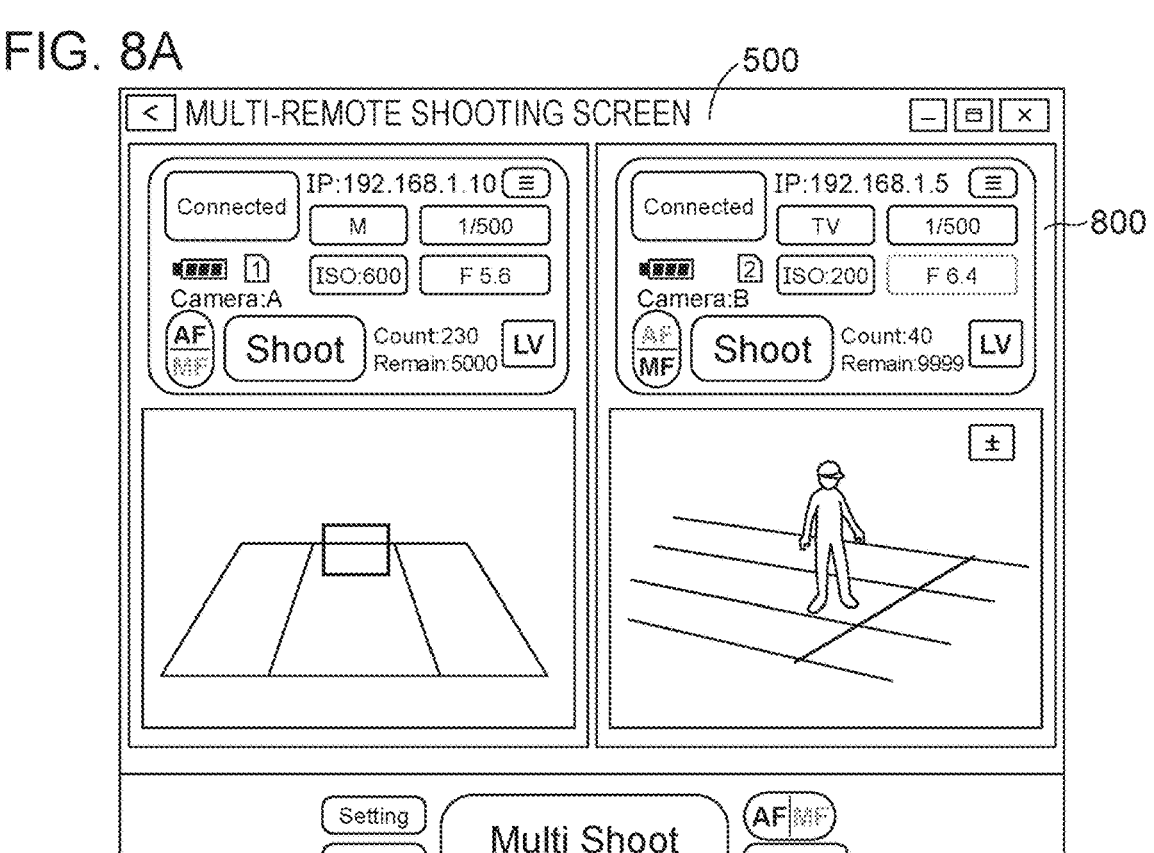
FIGS. 8A and 8B illustrate an example of a screen of a control device according to a second embodiment.
Figure 8B:
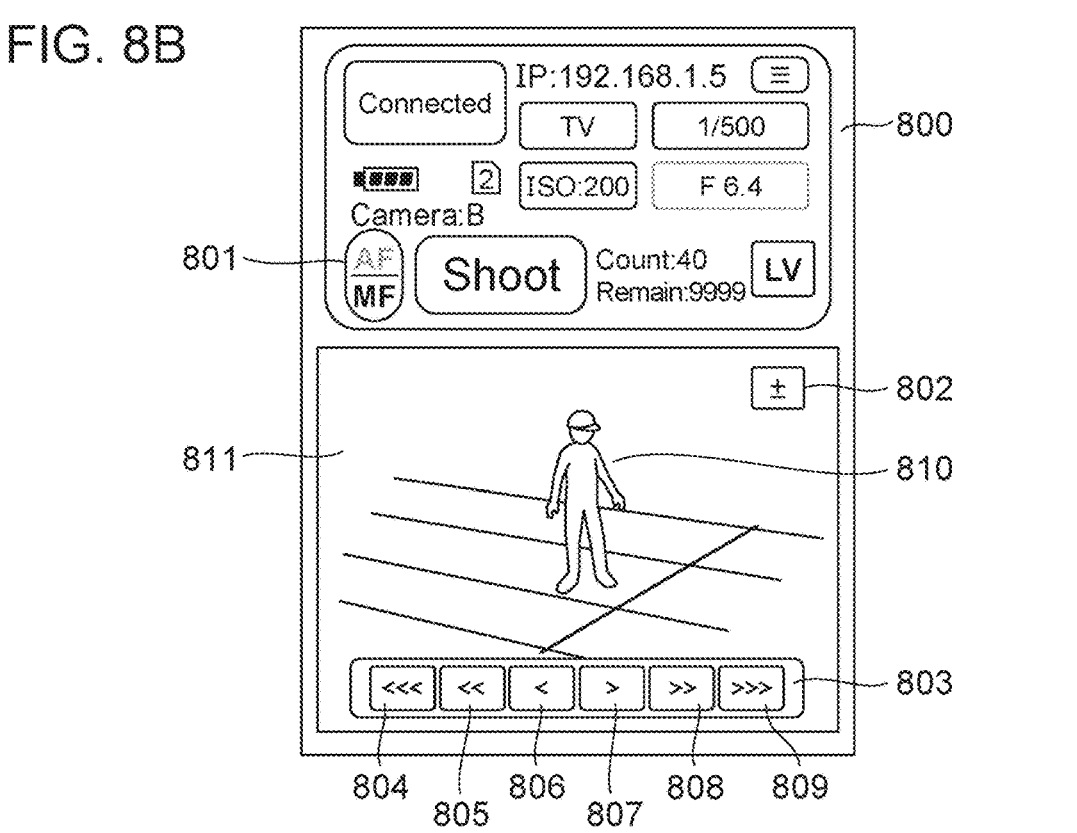

FIGS. 8A and 8B illustrate a multi-remote shooting screen and focus adjustment processing for when the control device 200 prepares for multi-remote shooting for the plurality of digital cameras 100.

FIG. 8A illustrates the multi-remote shooting screen 500 for when preparing for multi-remote shooting using a plurality of cameras is performed before a track competition.

In the composition as illustrated in FIG. 8B, in order to realize shooting intended by the user, a person 810 is caused to stand on the track. The person 810 represents an athlete whom the user wants to focus on. While checking a live view screen 811, the user adjusts, using an individual camera control member group 800, the focus of the digital camera 100 in advance by manually focusing the camera from the control unit 200.

For the user to set the manual focus adjustment setting, first, a manual focus adjustment member group 803 is displayed by operating an operational member 802. The control device 200 then sets the focus adjustment setting therein. In the focus adjustment setting, an operational member 804 for a large shift amount, an operational member 805 for a middle shift amount, and an operational member 806 for a small shift amount are used to move the focus of the connected digital camera 100 toward infinity, and an operational member 807 for a large shift amount, an operational member 808 for a middle shift amount, and an operational member 809 for a small shift amount are used to move the focus of the connected digital camera 100 toward the user.

Upon receiving a focus adjustment operation instruction from the user, the control device 200 issues a focus drive command to the digital camera 100, which is connected to the control device 200, to perform focus adjustment.

The history of the focus adjustment by the user using manual focus is recorded in the non-volatile memory 203 of the control device 200. The history is cleared when the user sets, using the operational member 801, the focus setting for when remote shooting is to be performed to autofocus, or is cleared when the connection with the digital camera 100 is disconnected.

Note that the recording of the history of focus adjustment performed using the operational member 802 for the manual focus setting is mentioned in the present embodiment; however, what is recorded is not limited to this operation. For example, history recording may be performed upon performance of an operation that indicates the photographer's intention to use fixed focus. An example of such an operation is switching to the fixed focus mode.

Figure 9:
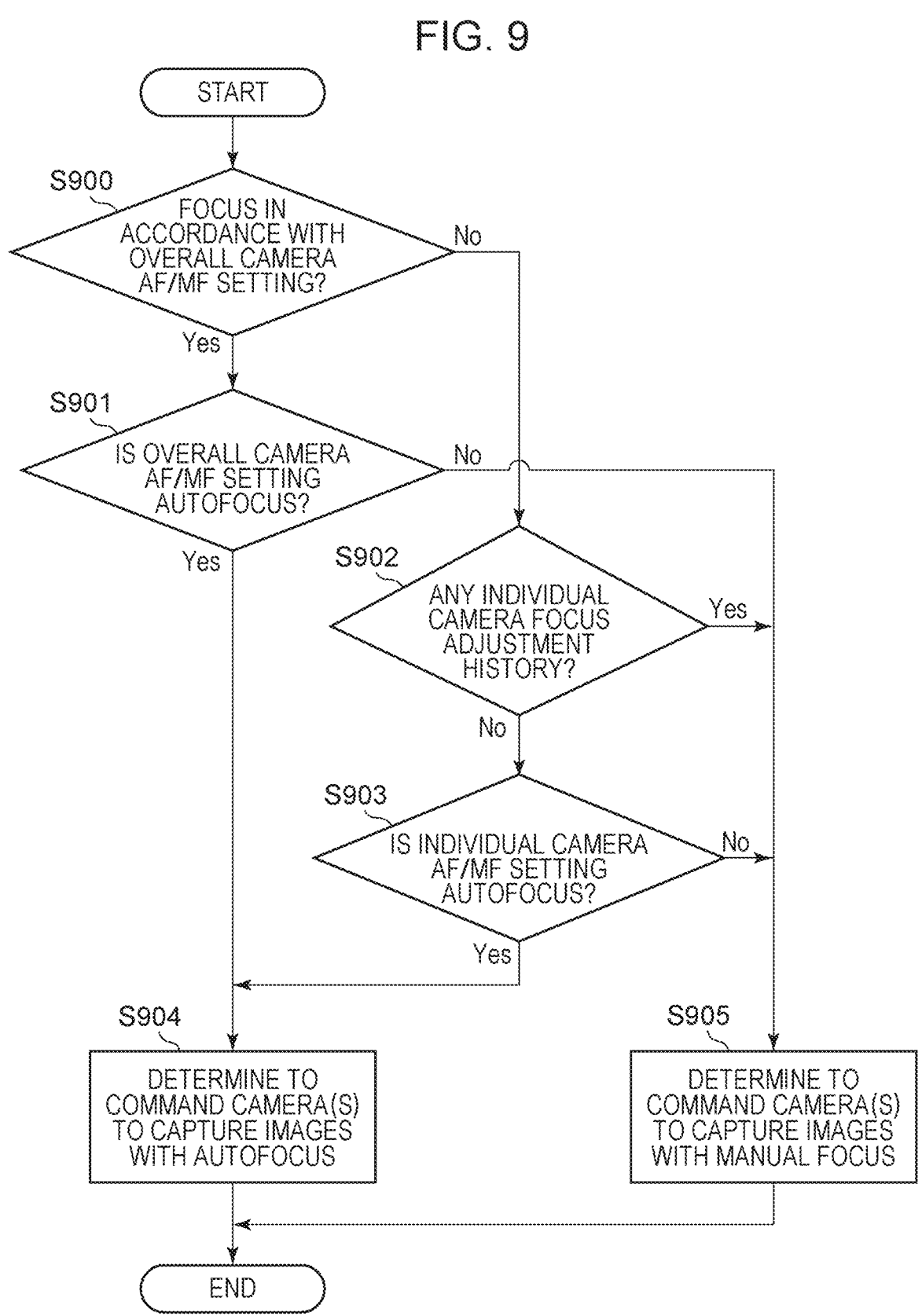
FIG. 9 is a flowchart illustrating the operation of the control device according to the second embodiment.

Flowchart for Remote Shooting Focus Determination Processing Based on Focus Adjustment History The flowchart illustrated in FIG. 9 illustrates the procedure through which the control device 200 determines, for an individual digital camera 100, focus drive control in remote shooting processing based on the focus adjustment history to perform multi-remote shooting control.

In the procedure of multi-remote shooting processing illustrated in the flowchart of FIG. 6B and performed on the plurality of digital cameras 100 by the control device 200, the flowchart of FIG. 9 starts from when it is determined in Step S613 that the digital camera 100 is to perform remote shooting.

In Step S900, the controller 201 determines, as the focus priority during remote shooting, the priority between the focus setting for individual camera shooting and the focus setting for overall camera shooting. In a case where the focus setting for individual camera shooting is to be prioritized, the process proceeds to Step S902. In a case where the focus setting for overall camera shooting is to be prioritized, the process proceeds to Step S901.

In Step S901, the controller 201 determines whether the focus setting for overall camera shooting set by the user indicates shooting with autofocus or shooting with fixed focus. In a case where shooting is to be performed with autofocus, the process proceeds to Step S904. In a case where shooting is to be performed with fixed focus, the process proceeds to Step S905.

In Step S902, the controller 201 determines whether there is a history indicating that the user has adjusted the focus of the digital camera 100 through a focus adjustment operation performed using the manual focus adjustment member group 803 of the individual camera control member group 800. In a case where a focus adjustment history is present, the process proceeds to Step S905. Otherwise, the process proceeds to Step S903.

In Step S903, the controller 201 determines whether the focus setting for individual camera shooting set by the user indicates shooting with autofocus or shooting with fixed focus. In a case where shooting is to be performed with autofocus, the process proceeds to Step S904. In a case where shooting is to be performed with fixed focus, the process proceeds to Step S905.

In Step S904, the controller 201 determines to set the remote shooting focus setting for the digital camera 100 to autofocus, and the procedure ends.

In Step S905, the controller 201 determines to set the remote shooting focus setting for the digital camera 100 to fixed focus, and the procedure ends.

The preceding text provides the description of the second embodiment. By using the history in the second embodiment, it is possible to estimate the user's intention and adopt the appropriate focus drive without explicit instruction from the user.

Other Embodiments

Some embodiments of the present disclosure can also be realized by supplying a program realizing one or more functions of the above-described embodiments to a system or an apparatus via a network or a storage medium and then by one or more processors of a computer of the system or apparatus reading out and executing the program. The present disclosure can also be realized by a circuit (for example, an application specific integrated circuit (ASIC)) that realizes one or more functions.

According to the present disclosure, it is possible to provide an environment that facilitates remote control more in line with the user's intention.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-046627, which was filed on Mar. 23, 2023, and Japanese Patent Application No. 2023-215255, which was filed on Dec. 20, 2023, which are hereby incorporated by reference herein in their entireties.

What is claimed is:

1. A control device configured to be connected to and control a plurality of image capturing apparatuses, the control device comprising:

an interface for communicating with a plurality of image capturing apparatuses;

one or more memories storing instructions; and one or more processors, wherein the one or more memories and the one or more processors are configured to:

select, for each of the plurality of image capturing apparatuses, a focus function to be used for the image capturing apparatus between an autofocus function and a manual focus function;

control the interface to transmit a first image capturing instruction to the plurality of image capturing apparatuses in response to an operation of pressing a button for enabling a user to perform multi-remote shooting using the plurality of image capturing apparatuses;

instruct, along with transmission of the first image capturing instruction, the plurality of image capturing apparatuses that receive the first image capturing instruction to use either the autofocus function or the manual focus function; and set, in advance of transmitting the first image capturing instruction, a respective priority between the selected focus function and the instructed focus function for each of the plurality of image capturing apparatuses.

2. The control device according to claim 1, wherein the one or more memories and the one or more processors are further configured to control the interface to transmit, in response to an operation of enabling a user to perform image capturing using an image capturing apparatus included in the plurality of image capturing apparatuses, a second image capturing instruction to the image capturing apparatus and information corresponding to the selected focus function.

3. The control device according to claim 2, further comprising:

a display device configured to display, on a screen, the button and a member configured to receive the operation of enabling a user to perform image capturing using an image capturing apparatus included in the plurality of image capturing apparatuses, wherein the button and the member configured to receive the operation of enabling a user to perform image capturing using an image capturing apparatus included in the plurality of image capturing apparatuses are displayed on an identical screen.

4. The control device according to claim 3, wherein the button is larger than the member configured to receive the operation of enabling a user to perform image capturing using an image capturing apparatus included in the plurality of image capturing apparatuses.

5. The control device according to claim 3, wherein the display device is configured to display live view images from the plurality of image capturing apparatuses, and wherein the button and the member configured to receive the operation of enabling a user to perform image capturing using an image capturing apparatus included in the plurality of image capturing apparatuses are displayed so as to sandwich a region where the live view images are displayed.

6. The control device according to claim 1, further comprising:

a display device configured to display live view images from the plurality of image capturing apparatuses, wherein the button is displayed below a region where the live view images are displayed.

7. The control device according to claim 1, wherein the one or more memories and the one or more processors are further configured to transmit, after receiving an instruction to adjust focus of any one of the plurality of image capturing apparatuses, a manual focus instruction along with an image capturing instruction to the image capturing apparatus for which the instruction to adjust focus has been received, in a case where the button has been pressed.

8. A control method for a control device configured to be connected to and control a plurality of image capturing apparatuses, the control method comprising:

selecting, for each of the plurality of image capturing apparatuses, a focus function to be used for the image capturing apparatus between an autofocus function and a manual focus function;

transmitting an image capturing instruction to the plurality of image capturing apparatuses in response to an operation of pressing a button for enabling a user to perform multi-remote shooting using the plurality of image capturing apparatuses;

instructing, along with the transmitting of the image capturing instruction, the plurality of image capturing apparatuses that receive the image capturing instruction to use either the autofocus function or the manual focus function; and setting, in advance of transmitting the image capturing instruction, a respective priority between the focus function selected in the selecting and the focus function instructed in the instructing for each of the plurality of image capturing apparatuses.

9. A non-transitory computer-readable storage medium which stores computer-executable instructions for causing a computer to execute a control method for a control device, the control method comprising:

selecting, for each of a plurality of image capturing apparatuses, a focus function to be used for the image capturing apparatus between an autofocus function and a manual focus function;

transmitting an image capturing instruction to the plurality of image capturing apparatuses in response to an operation of pressing a button for enabling a user to perform multi-remote shooting using the plurality of image capturing apparatuses;

instructing, along with the transmitting of the image capturing instruction, the plurality of image capturing apparatuses that receive the image capturing instruction to use either the autofocus function or the manual focus function; and setting, in advance of transmitting the image capturing instruction, a respective priority between the focus function selected in the selecting and the focus function instructed in the instructing for each of the plurality of image capturing apparatuses.

10. A control device configured to be connected to and control a plurality of image capturing apparatuses, the control device comprising:

a display device;

one or more memories storing instructions; and one or more processors, wherein the one or more memories and the one or more processors are configured to:

control the display device to display a plurality of first items for instructing all of the plurality of image capturing apparatuses to perform image capturing individually, and one second item for instructing all of the plurality of image capturing apparatuses to perform image capturing, control the display device to display a third item for instructing the plurality of image capturing apparatuses to use either autofocus or manual focus, and change a display size of the second item without changing a display size of the third item, wherein both in a case where the second item is displayed at a first display size and in a case where the second item is displayed at a second display size, the third item is arranged horizontally with respect to the second item.

11. The control device according to claim 10, wherein the one or more memories and the one or more processors are further configured to:

control the display device to change the display size of the second item to either the first display size or the second display size larger than the first display size in response to an operation performed by a user.

12. The control device according to claim 10, wherein the one or more memories and the one or more processors are further configured to:

control the display device to change the display size of the second item to either the first display size or the second display size larger than the first display size in response to an operation performed by a user, and in a case where the second item is displayed at the first display size, the first item is displayed so as to be operable, and in a case where the second item is displayed at the second display size, the first item is displayed so as to be inoperable.

13. The control device according to claim 10, wherein the one or more memories and the one or more processors are further configured to:

control the display device to display images captured by the plurality of image capturing apparatuses, and wherein the second item is superimposed and displayed on a display region of the images captured by the plurality of image capturing apparatuses.

14. The control device according to claim 13, wherein the images captured by the plurality of image capturing apparatuses are hidden by the second item that is superimposed and displayed on the display region.

15. The control device according to claim 13, wherein the second item is superimposed and displayed in a transparent display mode on the display region of the images captured by the plurality of image capturing apparatuses.

16. The control device according to claim 10, wherein the one or more memories and the one or more processors are further configured to change the display size of the second item in response to a user operation.

17. The control device according to claim 10, wherein the one or more memories and the one or more processors are further configured to change the display size of the second item in accordance with a display region width.

18. A control method for a control device configured to be connected to and control a plurality of image capturing apparatuses, the control method comprising:

displaying, on a display device, a plurality of first items for instructing each of the plurality of image capturing apparatuses to perform image capturing individually, and one second item for instructing all of the plurality of image capturing apparatuses to perform image capturing;

displaying, on the display device, a third item for instructing the plurality of image capturing apparatuses to use either autofocus or manual focus; and changing a display size of the second item without changing a display size of the third item in response to an operation performed by the user, wherein both in a case where the second item is displayed at a first display size and in a case where the second item is displayed at a second display size, the third item is arranged horizontally with respect to the second item.

19. A non-transitory computer-readable storage medium which stores computer-executable instructions for causing a computer to execute a control method for a control device, the control method comprising:

displaying, on a display device, a plurality of first items for instructing a plurality of image capturing apparatuses each to perform image capturing individually, and one second item for instructing all of the plurality of image capturing apparatuses to perform image capturing;

displaying, on the display device, a third item for instructing the plurality of image capturing apparatuses to use either autofocus or manual focus; and changing a display size of the second item without changing a display size of the third item in response to an operation performed by the user, wherein both in a case where the second item is displayed at a first display size and in a case where the second item is displayed at a second display size, the third item is arranged horizontally with respect to the second item.

* * * * *